US010489779B2

(12) United States Patent
Kumnick

(10) Patent No.: US 10,489,779 B2
(45) Date of Patent: Nov. 26, 2019

(54) MULTI-NETWORK TOKEN BIN ROUTING WITH DEFINED VERIFICATION PARAMETERS

(71) Applicant: Visa International Service Association, San Francisco, CA (US)

(72) Inventor: Phillip Kumnick, Phoenix, AZ (US)

(73) Assignee: Visa International Service Association, San Francisco, CA (US)

( * ) Notice: Subject to any disclaimer, the term of this patent is extended or adjusted under 35 U.S.C. 154(b) by 903 days.

(21) Appl. No.: 14/520,230

(22) Filed: Oct. 21, 2014

(65) Prior Publication Data

US 2015/0112871 A1    Apr. 23, 2015

Related U.S. Application Data

(60) Provisional application No. 61/893,761, filed on Oct. 21, 2013.

(51) Int. Cl.
    *G06Q 20/38*      (2012.01)
    *G06Q 20/40*      (2012.01)

(52) U.S. Cl.
    CPC ......... *G06Q 20/382* (2013.01); *G06Q 20/385* (2013.01); *G06Q 20/4012* (2013.01)

(58) Field of Classification Search
    CPC .... G06F 3/048; G06F 17/30867; G06F 21/32; G06F 21/42; G06Q 20/12;
(Continued)

(56) References Cited

U.S. PATENT DOCUMENTS 5,613,012 A    3/1997   Hoffman
5,781,438 A    7/1998   Lee
(Continued)

FOREIGN PATENT DOCUMENTS

EP        2156397 A1    2/2010
WO    2001035304 A1    5/2001
(Continued)

OTHER PUBLICATIONS

Wang, U.S. Appl. No. 62/000,288 (unpublished), Payment System Canonical Address Format filed May 19, 2014.
(Continued)

*Primary Examiner* — Johann Y Choo
(74) *Attorney, Agent, or Firm* — Kilpatrick Townsend & Stockton LLP

(57) ABSTRACT

Techniques described herein relate to using tokenization with BIN table routing by configuring a computer system, such as an acquirer computer, to utilize a token BIN translation table to determine which payment processing network(s) are eligible to route a transaction based upon a utilized token. In an embodiment, each token BIN translation table entry associates a token BIN with one or more payment processing networks that are eligible to route transactions. An acquirer computer, upon receiving a token for a transaction, thus may flexibly route the transaction to an eligible network from the set of payment processing networks identified by the entry corresponding to the token's BIN value. The entry may further identify verification methods for the eligible payment processing networks, and may identify product type attributes of the account associated with the token, either of which may be used in determining which payment processing network to select.

20 Claims, 6 Drawing Sheets

(58) Field of Classification Search
CPC .. G06Q 20/3829; G06Q 20/327; G06Q 30/02; G06Q 30/0234; G06Q 30/0261; G06Q 30/0237; G06Q 10/08; G06Q 20/18; G06Q 20/385; G06Q 20/4016

See application file for complete search history.

(56) References Cited

U.S. PATENT DOCUMENTS

| | | | |
|---|---|---|---|
| 5,883,810 A | 3/1999 | Franklin | |
| 5,953,710 A | 9/1999 | Fleming | |
| 5,956,699 A | 9/1999 | Wong | |
| 6,000,832 A | 12/1999 | Franklin | |
| 6,014,635 A | 1/2000 | Harris | |
| 6,044,360 A | 3/2000 | Picciallo | |
| 6,163,771 A | 12/2000 | Walker | |
| 6,227,447 B1 | 5/2001 | Campisano | |
| 6,236,981 B1 | 5/2001 | Hill | |
| 6,267,292 B1 | 7/2001 | Walker | |
| 6,327,578 B1 | 12/2001 | Linehan | |
| 6,341,724 B2 | 1/2002 | Campisano | |
| 6,385,596 B1 | 5/2002 | Wiser | |
| 6,422,462 B1 | 7/2002 | Cohen | |
| 6,425,523 B1 | 7/2002 | Shem Ur | |
| 6,592,044 B1 | 7/2003 | Wong | |
| 6,636,833 B1 | 10/2003 | Flitcroft | |
| 6,748,367 B1 | 6/2004 | Lee | |
| 6,805,287 B2 | 10/2004 | Bishop | |
| 6,879,965 B2 | 4/2005 | Fung | |
| 6,891,953 B1 | 5/2005 | DeMello | |
| 6,901,387 B2 | 5/2005 | Wells | |
| 6,931,382 B2 | 8/2005 | Laage | |
| 6,938,019 B1 | 8/2005 | Uzo | |
| 6,941,285 B2 | 9/2005 | Sarcanin | |
| 6,980,670 B1 | 12/2005 | Hoffman | |
| 6,990,470 B2 | 1/2006 | Hogan | |
| 6,991,157 B2 | 1/2006 | Bishop | |
| 7,051,929 B2 | 5/2006 | Li | |
| 7,069,249 B2 | 6/2006 | Stolfo | |
| 7,103,576 B2 | 9/2006 | Mann, III | |
| 7,113,930 B2 | 9/2006 | Eccles | |
| 7,136,835 B1 | 11/2006 | Flitcroft | |
| 7,177,835 B1 | 2/2007 | Walker | |
| 7,177,848 B2 | 2/2007 | Hogan | |
| 7,194,437 B1 | 3/2007 | Britto | |
| 7,209,561 B1 | 4/2007 | Shankar et al. | |
| 7,264,154 B2 | 9/2007 | Harris | |
| 7,287,692 B1 | 10/2007 | Patel | |
| 7,292,999 B2 | 11/2007 | Hobson | |
| 7,350,230 B2 | 3/2008 | Forrest | |
| 7,353,382 B2 | 4/2008 | Labrou | |
| 7,379,919 B2 | 5/2008 | Hogan | |
| RE40,444 E | 7/2008 | Linehan | |
| 7,415,443 B2 | 8/2008 | Hobson | |
| 7,444,676 B1 | 10/2008 | Asghari-Kamrani | |
| 7,469,151 B2 | 12/2008 | Khan | |
| 7,548,889 B2 | 6/2009 | Bhambri | |
| 7,567,934 B2 | 7/2009 | Flitcroft | |
| 7,567,936 B1 | 7/2009 | Peckover | |
| 7,571,139 B1 | 8/2009 | Giordano | |
| 7,571,142 B1 | 8/2009 | Flitcroft | |
| 7,580,898 B2 | 8/2009 | Brown | |
| 7,584,153 B2 | 9/2009 | Brown | |
| 7,593,896 B1 | 9/2009 | Flitcroft | |
| 7,606,560 B2 | 10/2009 | Labrou | |
| 7,627,531 B2 | 12/2009 | Breck | |
| 7,627,895 B2 | 12/2009 | Gifford | |
| 7,640,242 B2 * | 12/2009 | Chatterjee | G06F 9/466 |
| 7,650,314 B1 | 1/2010 | Saunders | |
| 7,685,037 B2 | 3/2010 | Reiners | |
| 7,702,578 B2 | 4/2010 | Fung | |
| 7,707,120 B2 | 4/2010 | Dominguez | |
| 7,712,655 B2 | 5/2010 | Wong | |
| 7,734,527 B2 | 6/2010 | Uzo | |
| 7,753,265 B2 | 7/2010 | Harris | |
| 7,770,789 B2 | 8/2010 | Oder, II | |
| 7,784,685 B1 | 8/2010 | Hopkins, III | |
| 7,793,851 B2 | 9/2010 | Mullen | |
| 7,801,826 B2 | 9/2010 | Labrou | |
| 7,805,376 B2 | 9/2010 | Smith | |
| 7,805,378 B2 | 9/2010 | Berardi | |
| 7,818,264 B2 | 10/2010 | Hammad | |
| 7,828,220 B2 | 11/2010 | Mullen | |
| 7,835,960 B2 | 11/2010 | Breck | |
| 7,841,523 B2 | 11/2010 | Oder, II | |
| 7,841,539 B2 | 11/2010 | Hewton | |
| 7,844,550 B2 | 11/2010 | Walker | |
| 7,848,980 B2 | 12/2010 | Carlson | |
| 7,849,020 B2 | 12/2010 | Johnson | |
| 7,853,529 B1 | 12/2010 | Walker | |
| 7,853,995 B2 | 12/2010 | Chow | |
| 7,865,414 B2 | 1/2011 | Fung | |
| 7,873,579 B2 | 1/2011 | Hobson | |
| 7,873,580 B2 | 1/2011 | Hobson | |
| 7,890,393 B2 | 2/2011 | Talbert | |
| 7,891,563 B2 | 2/2011 | Oder, II | |
| 7,896,238 B2 | 3/2011 | Fein | |
| 7,908,216 B1 | 3/2011 | Davis et al. | |
| 7,922,082 B2 | 4/2011 | Muscato | |
| 7,931,195 B2 | 4/2011 | Mullen | |
| 7,937,324 B2 | 5/2011 | Patterson | |
| 7,938,318 B2 | 5/2011 | Fein | |
| 7,954,705 B2 | 6/2011 | Mullen | |
| 7,959,076 B1 | 6/2011 | Hopkins, III | |
| 7,996,288 B1 | 8/2011 | Stolfo | |
| 8,025,223 B2 | 9/2011 | Saunders | |
| 8,046,256 B2 | 10/2011 | Chien | |
| 8,060,448 B2 | 11/2011 | Jones | |
| 8,060,449 B1 | 11/2011 | Zhu | |
| 8,074,877 B2 | 12/2011 | Mullen | |
| 8,074,879 B2 | 12/2011 | Harris | |
| 8,082,210 B2 | 12/2011 | Hansen | |
| 8,095,113 B2 | 1/2012 | Kean | |
| 8,104,679 B2 | 1/2012 | Brown | |
| RE43,157 E | 2/2012 | Bishop | |
| 8,109,436 B1 | 2/2012 | Hopkins, III | |
| 8,121,942 B2 | 2/2012 | Carlson | |
| 8,121,956 B2 | 2/2012 | Carlson | |
| 8,126,449 B2 | 2/2012 | Beenau | |
| 8,171,525 B1 | 5/2012 | Pelly | |
| 8,175,973 B2 | 5/2012 | Davis et al. | |
| 8,190,523 B2 | 5/2012 | Patterson | |
| 8,196,813 B2 | 6/2012 | Vadhri | |
| 8,205,791 B2 | 6/2012 | Randazza | |
| 8,219,489 B2 | 7/2012 | Patterson | |
| 8,224,702 B2 | 7/2012 | Mengerink | |
| 8,225,385 B2 | 7/2012 | Chow | |
| 8,229,852 B2 | 7/2012 | Carlson | |
| 8,265,993 B2 | 9/2012 | Chien | |
| 8,280,777 B2 | 10/2012 | Mengerink | |
| 8,281,991 B2 | 10/2012 | Wentker et al. | |
| 8,328,095 B2 | 12/2012 | Oder, II | |
| 8,336,088 B2 | 12/2012 | Raj et al. | |
| 8,346,666 B2 | 1/2013 | Lindelsee et al. | |
| 8,376,225 B1 | 2/2013 | Hopkins, III | |
| 8,380,177 B2 | 2/2013 | Laracey | |
| 8,387,873 B2 | 3/2013 | Saunders | |
| 8,401,539 B2 | 3/2013 | Beenau | |
| 8,401,898 B2 | 3/2013 | Chien | |
| 8,402,555 B2 | 3/2013 | Grecia | |
| 8,403,211 B2 | 3/2013 | Brooks | |
| 8,412,623 B2 | 4/2013 | Moon | |
| 8,412,837 B1 | 4/2013 | Emigh | |
| 8,417,642 B2 | 4/2013 | Oren | |
| 8,447,699 B2 | 5/2013 | Batada | |
| 8,453,223 B2 | 5/2013 | Svigals | |
| 8,453,925 B2 | 6/2013 | Fisher | |
| 8,458,487 B1 | 6/2013 | Palgon | |
| 8,484,134 B2 | 7/2013 | Hobson | |
| 8,485,437 B2 | 7/2013 | Mullen | |
| 8,494,959 B2 | 7/2013 | Hathaway | |
| 8,498,908 B2 | 7/2013 | Mengerink | |
| 8,504,475 B2 | 8/2013 | Brand et al. | |
| 8,504,478 B2 | 8/2013 | Saunders | |
| 8,510,816 B2 | 8/2013 | Quach | |

(56) References Cited

U.S. PATENT DOCUMENTS

| | | |
|---|---|---|
| 8,433,116 B2 | 9/2013 | Davis et al. |
| 8,533,860 B1 | 9/2013 | Grecia |
| 8,534,564 B2 | 9/2013 | Hammad |
| 8,538,845 B2 | 9/2013 | Liberty |
| 8,555,079 B2 | 10/2013 | Shablygin |
| 8,566,168 B1 | 10/2013 | Bierbaum |
| 8,567,670 B2 | 10/2013 | Stanfield |
| 8,571,939 B2 | 10/2013 | Lindsey |
| 8,577,336 B2 | 11/2013 | Mechaley, Jr. |
| 8,577,803 B2 | 11/2013 | Chatterjee |
| 8,577,813 B2 | 11/2013 | Weiss |
| 8,578,176 B2 | 11/2013 | Mattsson |
| 8,583,494 B2 | 11/2013 | Fisher |
| 8,584,251 B2 | 11/2013 | Mcguire |
| 8,589,237 B2 | 11/2013 | Fisher |
| 8,589,271 B2 | 11/2013 | Evans |
| 8,589,291 B2 | 11/2013 | Carlson |
| 8,595,098 B2 | 11/2013 | Starai |
| 8,595,812 B2 | 11/2013 | Bomar |
| 8,595,850 B2 | 11/2013 | Spies |
| 8,606,638 B2 | 12/2013 | Dragt |
| 8,606,700 B2 | 12/2013 | Carlson |
| 8,606,720 B1 | 12/2013 | Baker |
| 8,615,468 B2 | 12/2013 | Varadarajan |
| 8,620,754 B2 | 12/2013 | Fisher |
| 8,635,157 B2 | 1/2014 | Smith |
| 8,646,059 B1 | 2/2014 | Von Behren |
| 8,651,374 B2 | 2/2014 | Brabson |
| 8,656,180 B2 | 2/2014 | Shablygin |
| 8,751,391 B2 | 6/2014 | Freund |
| 8,762,263 B2 | 6/2014 | Gauthier et al. |
| 8,793,186 B2 | 7/2014 | Patterson |
| 8,806,622 B2 * | 8/2014 | Waterson ............... G06F 21/56 726/22 |
| 8,838,982 B2 | 9/2014 | Carlson et al. |
| 8,856,539 B2 | 10/2014 | Weiss |
| 8,887,308 B2 | 11/2014 | Grecia |
| 9,065,643 B2 | 6/2015 | Hurry et al. |
| 9,070,129 B2 | 6/2015 | Sheets et al. |
| 9,100,826 B2 | 8/2015 | Weiss |
| 9,160,741 B2 | 10/2015 | Wentker et al. |
| 9,165,134 B2 * | 10/2015 | Lorenzo ................. G06F 21/41 |
| 9,229,964 B2 | 1/2016 | Stevelinck |
| 9,245,267 B2 | 1/2016 | Singh |
| 9,249,241 B2 | 2/2016 | Dai et al. |
| 9,256,871 B2 | 2/2016 | Anderson et al. |
| 9,280,765 B2 | 3/2016 | Hammad |
| 9,530,137 B2 | 12/2016 | Weiss |
| 2001/0029485 A1 | 10/2001 | Brody |
| 2001/0034720 A1 | 10/2001 | Armes |
| 2001/0054003 A1 | 12/2001 | Chien |
| 2002/0007320 A1 | 1/2002 | Hogan |
| 2002/0016749 A1 | 2/2002 | Borecki |
| 2002/0029193 A1 | 3/2002 | Ranjan |
| 2002/0035548 A1 | 3/2002 | Hogan |
| 2002/0073045 A1 | 6/2002 | Rubin |
| 2002/0116341 A1 | 8/2002 | Hogan |
| 2002/0133467 A1 | 9/2002 | Hobson |
| 2002/0147913 A1 | 10/2002 | Lun Yip |
| 2003/0028481 A1 | 2/2003 | Flitcroft |
| 2003/0130955 A1 | 7/2003 | Hawthorne |
| 2003/0191709 A1 | 10/2003 | Elston |
| 2003/0191945 A1 | 10/2003 | Keech |
| 2004/0010462 A1 | 1/2004 | Moon |
| 2004/0050928 A1 | 3/2004 | Bishop |
| 2004/0059682 A1 | 3/2004 | Hasumi |
| 2004/0093281 A1 | 5/2004 | Silverstein |
| 2004/0139008 A1 | 7/2004 | Mascavage |
| 2004/0143532 A1 | 7/2004 | Lee |
| 2004/0158532 A1 | 8/2004 | Breck |
| 2004/0210449 A1 | 10/2004 | Breck |
| 2004/0210498 A1 | 10/2004 | Freund |
| 2004/0232225 A1 | 11/2004 | Bishop |
| 2004/0260646 A1 | 12/2004 | Berardi |
| 2005/0037735 A1 | 2/2005 | Coutts |
| 2005/0080730 A1 | 4/2005 | Sorrentino |
| 2005/0108178 A1 | 5/2005 | York |
| 2005/0199709 A1 | 9/2005 | Linlor |
| 2005/0246293 A1 | 11/2005 | Ong |
| 2005/0269401 A1 | 12/2005 | Spitzer |
| 2005/0269402 A1 | 12/2005 | Spitzer |
| 2006/0235795 A1 | 10/2006 | Johnson |
| 2006/0237528 A1 | 10/2006 | Bishop |
| 2006/0242085 A1 | 10/2006 | Jones et al. |
| 2006/0278704 A1 | 12/2006 | Saunders |
| 2006/0293953 A1 * | 12/2006 | Nicholson ............... G06Q 20/18 705/14.19 |
| 2007/0107044 A1 | 5/2007 | Yuen |
| 2007/0129955 A1 | 6/2007 | Dalmia |
| 2007/0136193 A1 | 6/2007 | Starr |
| 2007/0136211 A1 | 6/2007 | Brown |
| 2007/0170247 A1 | 7/2007 | Friedman |
| 2007/0179885 A1 | 8/2007 | Bird |
| 2007/0208671 A1 | 9/2007 | Brown |
| 2007/0226218 A1 * | 9/2007 | Chatterjee ............... G06F 9/466 |
| 2007/0233597 A1 * | 10/2007 | Petersen ................. G06Q 20/04 705/39 |
| 2007/0245414 A1 | 10/2007 | Chan |
| 2007/0260544 A1 * | 11/2007 | Wankmueller ......... G06Q 20/40 705/44 |
| 2007/0288377 A1 | 12/2007 | Shaked |
| 2007/0291995 A1 | 12/2007 | Rivera |
| 2007/0294182 A1 | 12/2007 | Hammad |
| 2008/0015988 A1 | 1/2008 | Brown |
| 2008/0029607 A1 | 2/2008 | Mullen |
| 2008/0035738 A1 | 2/2008 | Mullen |
| 2008/0052226 A1 | 2/2008 | Agarwal |
| 2008/0054068 A1 | 3/2008 | Mullen |
| 2008/0054079 A1 | 3/2008 | Mullen |
| 2008/0054081 A1 | 3/2008 | Mullen |
| 2008/0065554 A1 | 3/2008 | Hogan |
| 2008/0065555 A1 | 3/2008 | Mullen |
| 2008/0091617 A1 * | 4/2008 | Hazel ................... G06Q 20/085 705/73 |
| 2008/0201264 A1 | 8/2008 | Brown |
| 2008/0201265 A1 | 8/2008 | Hewton |
| 2008/0228646 A1 | 9/2008 | Myers |
| 2008/0243702 A1 | 10/2008 | Hart |
| 2008/0245855 A1 | 10/2008 | Fein |
| 2008/0245861 A1 | 10/2008 | Fein |
| 2008/0283591 A1 | 11/2008 | Oder, II |
| 2008/0302869 A1 | 12/2008 | Mullen |
| 2008/0302876 A1 | 12/2008 | Mullen |
| 2008/0313264 A1 | 12/2008 | Pestoni |
| 2009/0006262 A1 | 1/2009 | Brown |
| 2009/0010488 A1 | 1/2009 | Matsuoka |
| 2009/0037333 A1 | 2/2009 | Flitcroft |
| 2009/0037388 A1 | 2/2009 | Coope |
| 2009/0043702 A1 | 2/2009 | Bennett |
| 2009/0048971 A1 | 2/2009 | Hathaway |
| 2009/0063291 A1 | 3/2009 | Robbins et al. |
| 2009/0070246 A1 | 3/2009 | Tieken |
| 2009/0106112 A1 | 4/2009 | Dalmia |
| 2009/0106160 A1 | 4/2009 | Skowronek |
| 2009/0134217 A1 | 5/2009 | Flitcroft |
| 2009/0157555 A1 | 6/2009 | Biffle |
| 2009/0159673 A1 | 6/2009 | Mullen |
| 2009/0159700 A1 | 6/2009 | Mullen |
| 2009/0159707 A1 | 6/2009 | Mullen |
| 2009/0173782 A1 | 7/2009 | Muscato |
| 2009/0200371 A1 | 8/2009 | Kean |
| 2009/0248583 A1 | 10/2009 | Chhabra |
| 2009/0276347 A1 | 11/2009 | Kargman |
| 2009/0281948 A1 | 11/2009 | Carlson |
| 2009/0294527 A1 | 12/2009 | Brabson |
| 2009/0307139 A1 | 12/2009 | Mardikar |
| 2009/0308921 A1 | 12/2009 | Mullen |
| 2009/0327131 A1 | 12/2009 | Beenau |
| 2010/0008535 A1 | 1/2010 | Abulafia |
| 2010/0088237 A1 | 4/2010 | Wankmueller |
| 2010/0094755 A1 | 4/2010 | Kloster |
| 2010/0106644 A1 | 4/2010 | Annan |
| 2010/0120408 A1 | 5/2010 | Beenau |
| 2010/0133334 A1 | 6/2010 | Vadhri |

(56) References Cited

U.S. PATENT DOCUMENTS

| | | |
|---|---|---|
| 2010/0138347 A1 | 6/2010 | Chen |
| 2010/0145860 A1 | 6/2010 | Pelegero |
| 2010/0161433 A1 | 6/2010 | White |
| 2010/0185545 A1 | 7/2010 | Royyuru |
| 2010/0211505 A1 | 8/2010 | Saunders |
| 2010/0223186 A1 | 9/2010 | Hogan |
| 2010/0228668 A1 | 9/2010 | Hogan |
| 2010/0235284 A1 | 9/2010 | Moore |
| 2010/0258620 A1 | 10/2010 | Torreyson |
| 2010/0291904 A1 | 11/2010 | Musfeldt |
| 2010/0299267 A1 | 11/2010 | Faith et al. |
| 2010/0306076 A1 | 12/2010 | Taveau |
| 2010/0325041 A1 | 12/2010 | Berardi |
| 2011/0010292 A1 | 1/2011 | Giordano |
| 2011/0016047 A1 | 1/2011 | Wu |
| 2011/0016320 A1 | 1/2011 | Bergsten |
| 2011/0040640 A1 | 2/2011 | Erikson |
| 2011/0047076 A1 | 2/2011 | Carlson et al. |
| 2011/0083018 A1 | 4/2011 | Kesanupalli |
| 2011/0087596 A1 | 4/2011 | Dorsey |
| 2011/0093397 A1 | 4/2011 | Carlson |
| 2011/0101092 A1 | 5/2011 | Fernandez |
| 2011/0125597 A1 | 5/2011 | Oder, II |
| 2011/0153437 A1 | 6/2011 | Archer |
| 2011/0153498 A1 | 6/2011 | Makhotin et al. |
| 2011/0154466 A1 | 6/2011 | Harper |
| 2011/0161233 A1 | 6/2011 | Tieken |
| 2011/0178926 A1 | 7/2011 | Lindelsee et al. |
| 2011/0191244 A1 | 8/2011 | Dai |
| 2011/0238511 A1 | 9/2011 | Park |
| 2011/0238573 A1 | 9/2011 | Varadarajan |
| 2011/0246317 A1 | 10/2011 | Coppinger |
| 2011/0258111 A1 | 10/2011 | Raj et al. |
| 2011/0272471 A1 | 11/2011 | Mullen |
| 2011/0272478 A1 | 11/2011 | Mullen |
| 2011/0276380 A1 | 11/2011 | Mullen |
| 2011/0276381 A1 | 11/2011 | Mullen |
| 2011/0276424 A1 | 11/2011 | Mullen |
| 2011/0276425 A1 | 11/2011 | Mullen |
| 2011/0295745 A1 | 12/2011 | White |
| 2011/0302081 A1 | 12/2011 | Saunders |
| 2012/0023567 A1 | 1/2012 | Hammad |
| 2012/0028609 A1 | 2/2012 | Hruska |
| 2012/0030047 A1 | 2/2012 | Fuentes et al. |
| 2012/0035998 A1 | 2/2012 | Chien |
| 2012/0041881 A1 | 2/2012 | Basu |
| 2012/0047237 A1 | 2/2012 | Arvidsson |
| 2012/0066078 A1 | 3/2012 | Kingston |
| 2012/0072350 A1 | 3/2012 | Goldthwaite |
| 2012/0078735 A1 | 3/2012 | Bauer |
| 2012/0078798 A1 | 3/2012 | Downing |
| 2012/0078799 A1 | 3/2012 | Jackson |
| 2012/0095852 A1 | 4/2012 | Bauer |
| 2012/0095865 A1 | 4/2012 | Doherty |
| 2012/0116902 A1 | 5/2012 | Cardina |
| 2012/0123882 A1 | 5/2012 | Carlson |
| 2012/0123940 A1 | 5/2012 | Killian |
| 2012/0129514 A1 | 5/2012 | Beenau |
| 2012/0143767 A1 | 6/2012 | Abadir |
| 2012/0143772 A1 | 6/2012 | Abadir |
| 2012/0158580 A1 | 6/2012 | Eram |
| 2012/0158593 A1 | 6/2012 | Garfinkle |
| 2012/0173431 A1 | 7/2012 | Ritchie |
| 2012/0185386 A1 | 7/2012 | Salama |
| 2012/0197807 A1 | 8/2012 | Schlesser |
| 2012/0203664 A1 | 8/2012 | Torossian |
| 2012/0203666 A1 | 8/2012 | Torossian |
| 2012/0215688 A1 | 8/2012 | Musser |
| 2012/0215696 A1 | 8/2012 | Salonen |
| 2012/0221421 A1 | 8/2012 | Hammad |
| 2012/0226582 A1 | 9/2012 | Hammad |
| 2012/0231844 A1 | 9/2012 | Coppinger |
| 2012/0233004 A1 | 9/2012 | Bercaw |
| 2012/0246070 A1 | 9/2012 | Vadhri |
| 2012/0246071 A1 | 9/2012 | Jain |
| 2012/0246079 A1 | 9/2012 | Wilson et al. |
| 2012/0265631 A1 | 10/2012 | Cronic |
| 2012/0271770 A1 | 10/2012 | Harris |
| 2012/0297446 A1 | 11/2012 | Webb |
| 2012/0300932 A1 | 11/2012 | Cambridge |
| 2012/0303503 A1 | 11/2012 | Cambridge |
| 2012/0303961 A1 | 11/2012 | Kean |
| 2012/0304273 A1 | 11/2012 | Bailey |
| 2012/0310725 A1 | 12/2012 | Chien |
| 2012/0310831 A1 | 12/2012 | Harris |
| 2012/0316992 A1 | 12/2012 | Oborne |
| 2012/0317035 A1 | 12/2012 | Royyuru |
| 2012/0317036 A1 | 12/2012 | Bower |
| 2013/0017784 A1 | 1/2013 | Fisher |
| 2013/0018757 A1 | 1/2013 | Anderson et al. |
| 2013/0019098 A1 | 1/2013 | Gupta |
| 2013/0031006 A1 | 1/2013 | Mccullagh et al. |
| 2013/0054337 A1 | 2/2013 | Brendell |
| 2013/0054466 A1 | 2/2013 | Muscato |
| 2013/0054474 A1 | 2/2013 | Yeager |
| 2013/0081122 A1 | 3/2013 | Svigals |
| 2013/0091028 A1 | 4/2013 | Oder ("J.D."), II |
| 2013/0110658 A1 | 5/2013 | Lyman |
| 2013/0111599 A1 | 5/2013 | Gargiulo |
| 2013/0117185 A1 | 5/2013 | Collison |
| 2013/0124290 A1 | 5/2013 | Fisher |
| 2013/0124291 A1 | 5/2013 | Fisher |
| 2013/0124364 A1 | 5/2013 | Mittal |
| 2013/0138525 A1 | 5/2013 | Bercaw |
| 2013/0144888 A1 | 6/2013 | Faith |
| 2013/0145148 A1 | 6/2013 | Shablygin |
| 2013/0145172 A1 | 6/2013 | Shablygin |
| 2013/0159154 A1 | 6/2013 | Purves et al. |
| 2013/0159178 A1 | 6/2013 | Colon |
| 2013/0159184 A1 | 6/2013 | Thaw |
| 2013/0166402 A1 | 6/2013 | Parento |
| 2013/0166456 A1 | 6/2013 | Zhang |
| 2013/0173736 A1 | 7/2013 | Krzeminski |
| 2013/0185202 A1 | 7/2013 | Goldthwaite |
| 2013/0191286 A1 | 7/2013 | Cronic |
| 2013/0191289 A1 | 7/2013 | Cronic |
| 2013/0198071 A1 | 8/2013 | Jurss |
| 2013/0198080 A1 | 8/2013 | Anderson et al. |
| 2013/0200146 A1 | 8/2013 | Moghadam |
| 2013/0204787 A1 | 8/2013 | Dubois |
| 2013/0204793 A1 | 8/2013 | Kerridge |
| 2013/0212007 A1 | 8/2013 | Mattsson |
| 2013/0212017 A1 | 8/2013 | Bangia |
| 2013/0212019 A1 | 8/2013 | Mattsson |
| 2013/0212024 A1 | 8/2013 | Mattsson |
| 2013/0212026 A1 | 8/2013 | Powell et al. |
| 2013/0212666 A1 | 8/2013 | Mattsson |
| 2013/0218698 A1 | 8/2013 | Moon |
| 2013/0218769 A1 | 8/2013 | Pourfallah et al. |
| 2013/0226799 A1 | 8/2013 | Raj |
| 2013/0226813 A1 | 8/2013 | Voltz |
| 2013/0246199 A1 | 9/2013 | Carlson |
| 2013/0246202 A1 | 9/2013 | Tobin |
| 2013/0246203 A1 | 9/2013 | Laracey |
| 2013/0246258 A1 | 9/2013 | Dessert |
| 2013/0246259 A1 | 9/2013 | Dessert |
| 2013/0246261 A1 | 9/2013 | Purves et al. |
| 2013/0246267 A1 | 9/2013 | Tobin |
| 2013/0254028 A1 | 9/2013 | Salci |
| 2013/0254052 A1 | 9/2013 | Royyuru |
| 2013/0254102 A1 | 9/2013 | Royyuru |
| 2013/0254117 A1 | 9/2013 | Von Mueller |
| 2013/0262296 A1 | 10/2013 | Thomas |
| 2013/0262302 A1 | 10/2013 | Lettow |
| 2013/0262315 A1 | 10/2013 | Hruska |
| 2013/0262316 A1 | 10/2013 | Hruska |
| 2013/0262317 A1 | 10/2013 | Collinge |
| 2013/0275300 A1 | 10/2013 | Killian |
| 2013/0275307 A1 | 10/2013 | Khan |
| 2013/0275308 A1 | 10/2013 | Paraskeva |
| 2013/0282502 A1 | 10/2013 | Jooste |
| 2013/0282563 A1 | 10/2013 | Masterson et al. |
| 2013/0282575 A1 | 10/2013 | Mullen |
| 2013/0282588 A1 | 10/2013 | Hruska |

(56) References Cited

U.S. PATENT DOCUMENTS

| | | |
|---|---|---|
| 2013/0297501 A1 | 11/2013 | Monk et al. |
| 2013/0297504 A1 | 11/2013 | Nwokolo |
| 2013/0297508 A1 | 11/2013 | Belamant |
| 2013/0304649 A1 | 11/2013 | Cronic |
| 2013/0308778 A1 | 11/2013 | Fosmark |
| 2013/0311382 A1 | 11/2013 | Fosmark |
| 2013/0317982 A1 | 11/2013 | Mengerink |
| 2013/0332344 A1 | 12/2013 | Weber |
| 2013/0339253 A1 | 12/2013 | Sincai |
| 2013/0346314 A1 | 12/2013 | Mogollon |
| 2014/0007213 A1 | 1/2014 | Sanin |
| 2014/0013106 A1 | 1/2014 | Redpath |
| 2014/0013114 A1 | 1/2014 | Redpath |
| 2014/0013452 A1 | 1/2014 | Aissi et al. |
| 2014/0019352 A1 | 1/2014 | Shrivastava |
| 2014/0025581 A1 | 1/2014 | Calman |
| 2014/0025585 A1 | 1/2014 | Calman |
| 2014/0025958 A1 | 1/2014 | Calman |
| 2014/0032417 A1 | 1/2014 | Mattsson |
| 2014/0032418 A1 | 1/2014 | Weber |
| 2014/0040114 A1 | 2/2014 | Baumgart et al. |
| 2014/0040137 A1 | 2/2014 | Carlson |
| 2014/0040139 A1 | 2/2014 | Brudnicki |
| 2014/0040144 A1 | 2/2014 | Plomske |
| 2014/0040145 A1 | 2/2014 | Ozvat |
| 2014/0040148 A1 | 2/2014 | Ozvat |
| 2014/0040628 A1 | 2/2014 | Fort |
| 2014/0041018 A1 | 2/2014 | Bomar |
| 2014/0046853 A1 | 2/2014 | Spies |
| 2014/0047551 A1 | 2/2014 | Nagasundaram et al. |
| 2014/0052532 A1 | 2/2014 | Tsai |
| 2014/0052620 A1 | 2/2014 | Rogers |
| 2014/0052637 A1 | 2/2014 | Jooste |
| 2014/0068706 A1 | 3/2014 | Aissi |
| 2014/0074637 A1 | 3/2014 | Hammad |
| 2014/0108172 A1 | 4/2014 | Weber et al. |
| 2014/0114857 A1 | 4/2014 | Griggs et al. |
| 2014/0143137 A1 | 5/2014 | Carlson |
| 2014/0164243 A1 | 6/2014 | Aabye et al. |
| 2014/0188586 A1 | 7/2014 | Carpenter et al. |
| 2014/0294701 A1 | 10/2014 | Dai et al. |
| 2014/0297534 A1 | 10/2014 | Patterson |
| 2014/0310183 A1 | 10/2014 | Weber |
| 2014/0330721 A1 | 11/2014 | Wang |
| 2014/0330722 A1 | 11/2014 | Laxminarayanan et al. |
| 2014/0331265 A1 | 11/2014 | Mozell et al. |
| 2014/0337236 A1 | 11/2014 | Wong et al. |
| 2014/0344153 A1 | 11/2014 | Raj et al. |
| 2014/0372308 A1 | 12/2014 | Sheets |
| 2015/0019443 A1 | 1/2015 | Sheets et al. |
| 2015/0032625 A1 | 1/2015 | Dill |
| 2015/0032626 A1 | 1/2015 | Dill |
| 2015/0032627 A1* | 1/2015 | Dill ............. G06Q 20/385 705/44 |
| 2015/0046338 A1 | 2/2015 | Laxminarayanan |
| 2015/0046339 A1 | 2/2015 | Wong et al. |
| 2015/0052064 A1 | 2/2015 | Karpenko et al. |
| 2015/0088756 A1 | 3/2015 | Makhotin et al. |
| 2015/0106239 A1 | 4/2015 | Gaddam et al. |
| 2015/0112870 A1 | 4/2015 | Nagasundaram et al. |
| 2015/0120472 A1 | 4/2015 | Aabye et al. |
| 2015/0127529 A1 | 5/2015 | Makhotin et al. |
| 2015/0127547 A1 | 5/2015 | Powell et al. |
| 2015/0140960 A1 | 5/2015 | Powell et al. |
| 2015/0142673 A1 | 5/2015 | Nelsen et al. |
| 2015/0161597 A1 | 6/2015 | Subramanian et al. |
| 2015/0178724 A1 | 6/2015 | Ngo et al. |
| 2015/0180836 A1 | 6/2015 | Wong et al. |
| 2015/0186864 A1 | 7/2015 | Jones et al. |
| 2015/0193222 A1 | 7/2015 | Pirzadeh et al. |
| 2015/0195133 A1 | 7/2015 | Sheets et al. |
| 2015/0199679 A1 | 7/2015 | Palanisamy et al. |
| 2015/0199689 A1 | 7/2015 | Kumnick et al. |
| 2015/0220917 A1 | 8/2015 | Aabye et al. |
| 2015/0269566 A1 | 9/2015 | Gaddam et al. |
| 2015/0312038 A1 | 10/2015 | Palanisamy |
| 2015/0319158 A1 | 11/2015 | Kumnick |
| 2015/0332262 A1 | 11/2015 | Lingappa |
| 2015/0356560 A1 | 12/2015 | Shastry et al. |
| 2016/0028550 A1 | 1/2016 | Gaddam et al. |
| 2016/0042263 A1 | 2/2016 | Gaddam et al. |
| 2016/0065370 A1 | 3/2016 | Le Saint et al. |
| 2016/0092696 A1 | 3/2016 | Guglani et al. |
| 2016/0092872 A1 | 3/2016 | Prakash et al. |
| 2016/0103675 A1 | 4/2016 | Aabye et al. |
| 2016/0119296 A1 | 4/2016 | Laxminarayanan et al. |
| 2016/0224976 A1 | 8/2016 | Basu |
| 2017/0046696 A1 | 2/2017 | Powell et al. |
| 2017/0103387 A1 | 4/2017 | Weber |
| 2017/0220818 A1 | 8/2017 | Nagasundaram et al. |
| 2017/0228723 A1 | 8/2017 | Taylor |

FOREIGN PATENT DOCUMENTS

| | | |
|---|---|---|
| WO | 2001035304 A9 | 5/2001 |
| WO | 2004042536 A2 | 5/2004 |
| WO | 2006113834 A2 | 10/2006 |
| WO | 2009032523 A1 | 3/2009 |
| WO | 2010078522 A1 | 7/2010 |
| WO | 2012068078 A2 | 5/2012 |
| WO | 2012098556 A1 | 7/2012 |
| WO | 2012142370 A2 | 10/2012 |
| WO | 2012167941 A1 | 12/2012 |
| WO | 2013048538 A1 | 4/2013 |
| WO | 2013056104 A1 | 4/2013 |
| WO | 2013119914 A1 | 8/2013 |
| WO | 2013179271 A2 | 12/2013 |

OTHER PUBLICATIONS

Sharma et al., U.S. Appl. No. 62/003,717 (unpublished), Mobile Merchant Application filed May 28, 2014.

Kalgi et al., U.S. Appl. No. 62/024,426, (unpublished) Secure Transactions Using Mobile Devices filed Jul. 14, 2014.

Prakash et al., U.S. Appl. No. 62/037,033 (unpublished), Sharing Payment Token filed Aug. 13, 2014.

Hoverson et al., U.S. Appl. No. 62/038,174 (unpublished), Customized Payment Gateway filed Aug. 15, 2014.

Wang, U.S. Appl. No. 62/042,050 (unpublished), Payment Device Authentication and Authorization System filed Aug. 26, 2014.

Gaddam et al., U.S. Appl. No. 62/053,736 (unpublished), Completing Transactions Without a User Payment Device filed Sep. 22, 2014.

Patterson, U.S. Appl. No. 62/054,346 (unpublished), Mirrored Token Vault filed Sep. 23, 2014.

Dimmick, U.S. Appl. No. 14/952,514 (unpublished), Systems Communications With Non-Sensitive Identifiers filed Nov. 25, 2015.

Dimmick, U.S. Appl. No. 14/952,444 (unpublished), Tokenization Request Via Access Device filed Nov. 25, 2015.

Prakash et al., U.S. Appl. No. 14/955,716 (unpublished), Provisioning Platform for Machine-To-Machine Devices filed Dec. 1, 2015.

Wong et al., U.S. Appl. No. 14/966,948 (unpublished), Automated Access Data Provisioning filed Dec. 11, 2015.

Stubbs et al., U.S. Appl. No. 62/103,522 (unpublished), Methods and Systems for Wallet Provider Provisioning filed Jan. 14, 2015.

McGuire, U.S. Appl. No. 14/600,523 (unpublished), Secure Payment Processing Using Authorization Request filed Jan. 20, 2015.

Flurscheim et al., U.S. Appl. No. 15/004,705 (unpublished), Cloud-Based Transactions With Magnetic Secure Transmission filed Jan. 22, 2016.

Flurscheim et al., U.S. Appl. No. 62/108,403 (unpublished), Wearables With NFC HCE filed Jan. 27, 2015.

Sabba et al., U.S. Appl. No. 15/011,366 (unpublished), Token Check Offline filed Jan. 29, 2016.

Patterson, U.S. Appl. No. 15/019,157 (unpublished), Token Processing Utilizing Multiple Authorizations filed Feb. 9, 2016.

Cash et al., U.S. Appl. No. 15/041,495 (unpublished), Peer Forward Authorization of Digital Requests filed Feb. 11, 2016.

(56) References Cited

OTHER PUBLICATIONS

Le Saint et al., , U.S. Appl. No. 15/008,388 (unpublished), Methods for Secure Credential Provisioning filed Jan. 27, 2016.
Kinagi, U.S. Appl. No. 62/117,291 (unpublished), Token and Cryptogram Using Transaction Specific Information filed Feb. 17, 2015.
Galland et al. U.S. Appl. No. 62/128,709 (unpublished), Tokenizing Transaction Amounts filed Mar. 5, 2015.
Rangarajan et al., U.S. Appl. No. 61/751,763 (unpublished), Payments Bridge filed Jan. 11, 2013.
Li, U.S. Appl. No. 61/894,749 (unpublished), Methods and Systems for Authentication and Issuance of Tokens in a Secure Environment filed Oct. 23, 2013.
Aissi et al., U.S. Appl. No. 61/738,832 (unpublished), Management of Sensitive Data filed Dec. 18, 2012.
Wong et al., U.S. Appl. No. 61/879,362 (unpublished), Systems and Methods for Managing Mobile Cardholder Verification Methods filed Sep. 18, 2013.
Powell, U.S. Appl. No. 61/892,407 (unpublished), Issuer Over-The-Air Update Method and System filed Oct. 17, 2013.
Powell, U.S. Appl. No. 61/926,236 (unpublished), Methods and Systems for Provisioning Mobile Devices With Payment Credentials and Payment Token Identifiers filed Jan. 10, 2014.
Petition for Inter Partes Review of U.S. Pat. No. 8,533,860 Challenging Claims 1-30 Under 35 U.S.C. § 312 and 37 C.F.R. § 42.104, filed Feb. 17, 2016, Before the USPTO Patent Trial and Appeal Board, IPR 2016-00600, 65 pages.
Chipman, et al., U.S. Appl. No. 15/265,282 (Unpublished), Self-Cleaning Token Vault, filed Sep. 14, 2016.
Lopez, et al., U.S. Appl. No. 15/462,658 (Unpublished), Replacing Token on a Multi-Token User Device, filed Mar. 17, 2017.

* cited by examiner

MULTI-NETWORK TOKEN BIN ROUTING WITH DEFINED VERIFICATION PARAMETERS

CROSS REFERENCE TO RELATED APPLICATIONS

This application is a non-provisional application and claims the benefit of priority of U.S. Provisional Application No. 61/893,761 titled "DIRECT TO NETWORK" and filed on Oct. 21, 2013, which is herein incorporated by reference in its entirety for all purposes.

FIELD

Aspects of the disclosure relate to computing technologies. In particular, aspects of the disclosure relate to systems, methods, apparatuses, and computer-readable media for routing transaction data via multiple payment processing networks using token BIN translation table data including defined network verification parameters.

BACKGROUND

As the number of electronic transactions occurring in the world continues to rise, it is increasingly difficult for the involved entities, such as merchants and banks, to manage and process these electronic transactions and associated accounts efficiently and effectively. Simultaneously, this complexity has further increased due to ever-changing payment and network technologies and legislation.

In performing commercial electronic transactions, merchants and banks typically have many credit networks and/or debit networks from which to choose between, and a variety of rules that may bind certain transactions to specific networks. Thus, determining the proper payment processing network where a transaction may or should be processed can thus be particularly challenging, especially when a conflict exists between these types of rules, or when there are multiple options that are available. Consequently, there is a need for improved systems and methods for efficiently and effectively determining which network should be used for processing a particular transaction.

Embodiments of the invention address these and other problems, individually and collectively.

BRIEF SUMMARY

Systems, methods, apparatuses, and computer-readable media are described herein for using tokenization with BIN table routing. According to some embodiments, a token BIN value is associated with multiple payment processing networks that are eligible to route transactions. In one embodiment, a token BIN translation table is utilized that includes one or more entries. Each entry maps a token BIN value to one or more payment processing networks that are configured as eligible for processing transactions of the associated account. Thus, in some embodiments, a token BIN may be "globally" associated with a specific combination of payment processing networks, and the token BIN may be selected for inclusion within a token purposefully based upon the desired combination of desired eligible payment processing networks. Thus, in some embodiments a merchant and/or acquirer receiving a token with a token BIN for a transaction will have the flexibility to route the transaction to an eligible network from the combination of networks corresponding to that token BIN.

In some embodiments, a single token BIN translation table entry may identify, for a token BIN, multiple payment processing networks that are eligible to process transactions for using that token BIN. The multiple payment processing networks may include both credit processing networks, debit processing networks, or other types of processing networks (e.g., hybrid networks for both credit and debit, etc.). In some embodiments, a token BIN may be associated with multiple debit networks and multiple credit networks.

According to an embodiment, a method is described that includes receiving, at a computing device, a first transaction information for a first transaction. The first transaction information includes a first token value associated with a first account serving as a payment account for the first transaction. The first token value includes a token bank identification number (BIN). The first transaction information does not include any primary account number (PAN) value of the first account. The method also includes identifying, by the computing device based upon the token BIN, a first entry of a plurality of entries of a token BIN translation table. The first entry is associated with the token BIN and identifies a plurality of payment processing networks that are eligible to process transactions associated with the token BIN. The first entry further identifies a plurality of verification methods corresponding to the plurality of payment processing networks. The method also includes selecting, by the computing device, a first of the plurality of payment processing networks to process the transaction based at least in part upon the transaction information. The method further includes transmitting the transaction information to the selected first payment processing network.

In some embodiments, at least one of the plurality of payment processing networks that are eligible to process transactions associated with the token BIN is a credit network, and at least one of the plurality of payment processing networks that are eligible to process transactions associated with the token BIN is a debit network.

In some embodiments, at least one of the plurality of verification methods indicates that the corresponding payment processing network is a personal identification number (PIN) verification network, and at least one of the plurality of verification methods indicates that the corresponding payment processing network is a signature verification network. In some embodiments, one or more of the plurality of verification methods are from an additional set of verification methods comprising biometric verification, voice authentication, triangulation of multiple but unique characteristics of the consumer and their payment credentials, challenge-response authentication, two-factor verification methods used to verify a consumer's authorization to affect payments or transact electronically, etc.

According to an embodiment, a non-transitory computer readable medium is described that stores instructions which, when executed by one or more processors of a computing device, cause the computing device to perform operations. The operations include receiving, at the computing device, a first transaction information for a first transaction. The first transaction information includes a first token value associated with a first account serving as a payment account for the first transaction. The first token value includes a token bank identification number (BIN). The first transaction information does not include any primary account number (PAN) value of the first account. The operations also include identifying, by the computing device based upon the token BIN, a first entry of a plurality of entries of a token BIN translation table. The first entry is associated with the token BIN and identifies a plurality of payment processing networks that are eligible to process transactions associated with the token BIN. The first entry further identifies a plurality of verification methods corresponding to the plurality of payment processing networks. The operations also include selecting, by the computing device, a first of the plurality of payment processing networks to process the transaction based at least in part upon the transaction information. The operations further include transmitting the transaction information to the selected first payment processing network.

According to an embodiment, a computing device is described that includes one or more processors, one or more network interfaces communicatively coupled with the one or more processors, and a non-transitory computer readable medium that stores instructions which, when executed by the one or more processors, cause the computing device to perform operations. The operations include receiving, at the one or more network interfaces of the computing device, a first transaction information for a first transaction. The first transaction information includes a first token value associated with a first account serving as a payment account for the first transaction. The first token value includes a token bank identification number (BIN). The first transaction information does not include any primary account number (PAN) value of the first account. The operations also include identifying, by the one or more processors of the computing device based upon the token BIN, a first entry of a plurality of entries of a token BIN translation table. The first entry is associated with the token BIN and identifies a plurality of payment processing networks that are eligible to process transactions associated with the token BIN. The first entry further identifies a plurality of verification methods corresponding to the plurality of payment processing networks. The operations also include selecting, by the one or more processors of the computing device, a first of the plurality of payment processing networks to process the transaction based at least in part upon the transaction information. The operations further include transmitting, using the one or more network interfaces of the computing device, the transaction information to the selected first payment processing network. In some embodiments, the transmission of the transaction information includes details necessary to support the transport of verification information or the results of a verification review process that may occur prior to transmission.

Accordingly, embodiments of the invention allow computing devices to constrain the size of necessary transaction routing tables via use of token BIN translation tables that associate multiple eligible payment processing networks with one token BIN. Thus, memory and processor usage is greatly reduced, and the system thus provides excellent scaling with increased traffic and allows for additional applications/processes to run without jeopardizing transaction routing performance of the implementing computing devices. Accordingly, embodiments can allow for flexible routing (e.g., allowing for the choice between multiple credit and/or debit networks) without the significant memory, processing, or network overhead involved in other approaches that would require huge numbers of routing table entries and frequent, bandwidth consuming, disruptive update processes. Moreover, in some embodiments, the logic required to be implemented for making routing decisions is greatly simplified (and thus, the size and complexity logic is greatly reduced) as all or nearly all information required for decision making purposes is self-contained within the token BIN translation table itself.

The foregoing has broadly outlined some features and technical benefits of examples according to the disclosure in order for the detailed description that follows to be better understood. Additional features and benefits will be described hereinafter. The conception and specific examples disclosed can be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages, will be better understood from the following description when considered in connection with the accompanying figures. Each of the figures is provided for the purpose of illustration and description only and not as a definition of the limits of the claims.

DETAILED DESCRIPTION

Figure 1:
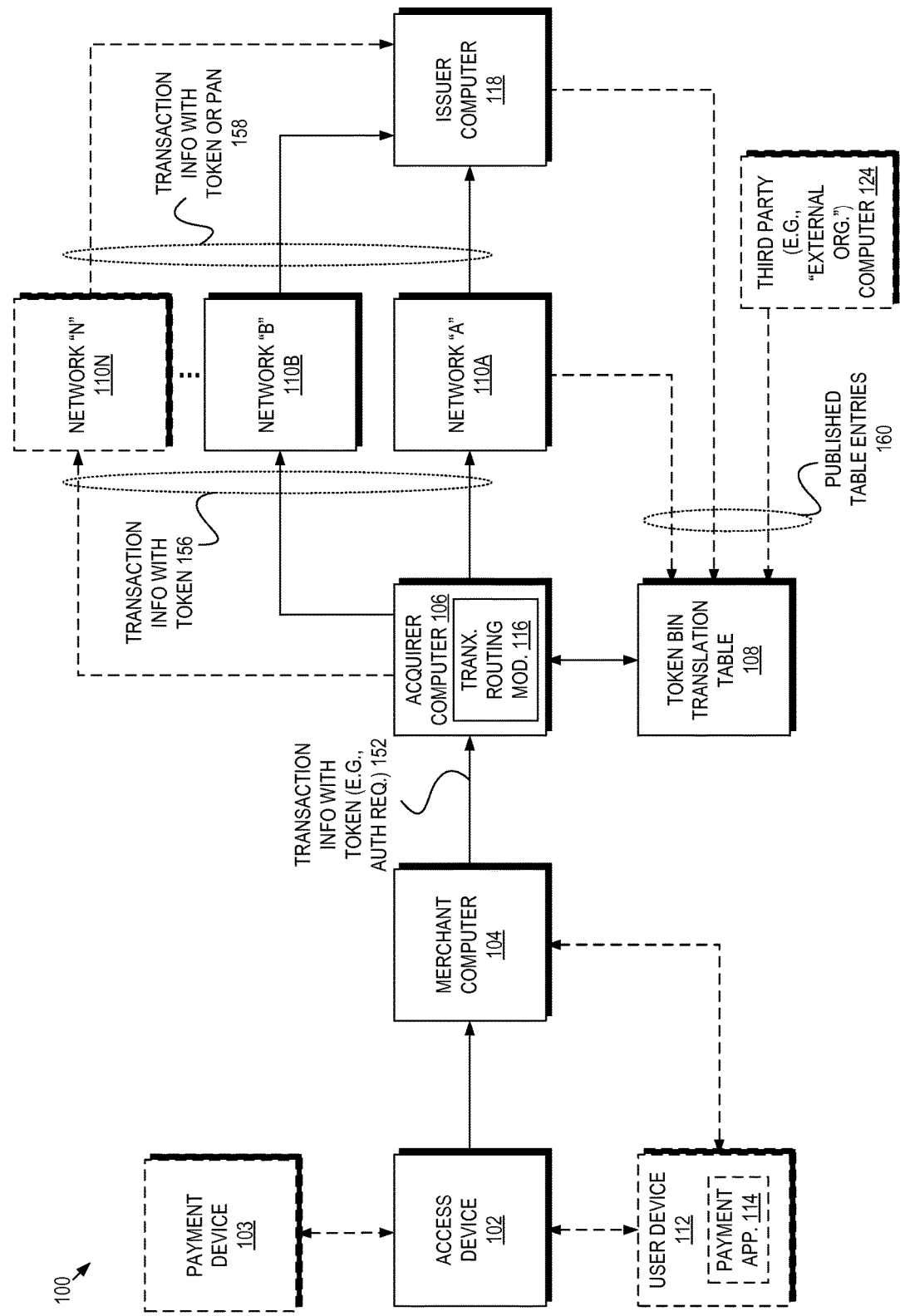
FIG. 1 illustrates a block diagram of entities in a payment transaction system employing multi-network token BIN routing according to an embodiment of the invention.

Generally, a payment account number (or PAN) comprises a sixteen digit account number and is allocated in accordance with ISO/IEC 7812. The sixteen digit account number may include a four or six digit Issuer Identification Number (IIN) or Bank Identification Number (BIN), which may be a variable length account number of up to twelve digits and a single check digit. The first digit of the six digits BIN may include a Major Industry Identifier (MII), which represents the category of the entity that issued the payment account. For example, a value of the MII digit equal to 3, 4, 5, or 6 currently implies a banking or financial institution.

A BIN or IIN number may serve to identify the institution that issued the payment account to the account holder. For example, a BIN beginning with a "4" may indicate that the associated issuing network as Visa®, whereas, a BIN range of 51-55 (i.e., all BIN values beginning with 51, 52, 53, 54, or 55) may indicate that the associated issuing network is MasterCard®. Thus, different issuing networks may use different BIN values and/or ranges to identify the network.

BIN values are often used to assist in determining how to "route" financial transaction data to an issuer of a payment account. Generally, merchants and acquirers utilize BIN (Bank Identification Number) tables to determine which payment processing network is to be used to route a transaction. These BIN tables, also commonly referred to as BIN routing tables or BIN databases, often include entries that each map a BIN of an account to a particular processing network (or, to a specific endpoint within the processing network within which it resides) to be used for routing transactions having that BIN of an issuer. Thus, upon receipt of transaction information (e.g., a payment authorization request message) from a merchant including a Primary Account Number (PAN) of an account of the payer in the transaction, an acquirer may identify the BIN portion of the PAN and use it as an index (or "key") into the BIN table to identify the processing network to be used to route the transaction information toward the correct issuer.

However, making routing decisions becomes complicated when tokenization is utilized. Tokenization is a process of substituting sensitive data (e.g., a PAN of an account) with a non-sensitive equivalent referred to as a token. The token may comprise a same number of digits as the associated PAN (e.g., each is sixteen digits in length) or may be a different length. Such tokens typically do not have any extrinsic or exploitable meaning or value, and thus, without access to the underlying mapping between the token and the associated sensitive data, the token is meaningless. Thus, a token may be viewed as a reference or identifier that can be mapped back to sensitive data. Accordingly, some payment systems are configured to utilize tokens instead of PANs, such that the exposure of the token to a third party is not particularly harmful. For example, an access device (e.g., a card processing terminal or Point of Sale (POS) terminal) may be configured to, upon receipt of a PAN from a user (e.g., via a swipe of a card, an entry via a website, or via communications with a payment device), generate a token "on-the-fly" and use that token instead of the PAN within a payment authorization request message. This token may only be "de-tokenized" (i.e., translated back to the associated PAN) by the proper entity aware of the tokenization scheme, such as an issuer of the account, a payment processing network that routes transactions of that account, or perhaps a third party token services provider.

In some cases, the traditional "BIN portion" of the token (e.g., the last four digits of a token) may match the "BIN portion" (e.g., the last four digits) of the associated PAN. In these cases, a merchant or acquirer could continue to use the BIN tables without any change, as routing decisions would be based upon a same BIN value for either the actual PAN or the token.

However, some tokenization processes and/or tokenization systems may not maintain the BIN portion of the associated PAN. In this case, one approach to continuing to utilize BIN tables includes adding, to the BIN tables, BIN table entries mapping these token "BIN portion" values to their designated networks. In these configurations, as unique tokens (and thus, potentially unique BIN portion values of the tokens) may be generated very frequently (when compared to traditional PANs), this may require BIN tables to be updated very frequently.

Additionally, with tokenization, supporting multiple payment processing networks for one underlying account is further complicated. As an example, multiple tokens may be issued for one particular account, each of which having a different BIN portion value to allow for multiple different payment processing networks to be deemed as eligible for routing transactions associated with the account.

Thus, in some such embodiments, multiple BIN table entries are required to be placed within the BIN tables to correspond to the multiple BIN portion values (of the multiple tokens) for the one account. Thus, if one account is to be associated with six different payment processing networks, then six tokens may be issued for the account, and six different BIN portion values of those six tokens will be inserted as six different entries in a BIN table. For example, for a payment card number starting with "499999," a token BIN may be generated as "412345" for routing transactions through a first network, whereas another token BIN may be generated for the same payment account as "467890" for routing transactions through a second network.

Therefore, BIN tables may include multiple entries for the same payment account to accommodate different networks or combination of networks. For example, one entry for a first network may be for a signature network (e.g., Visa®, MasterCard®, American Express®, Discover®, etc.) and another entry for a second network may be a PIN (Personal Identification Number) network (e.g., Visa® debit, MasterCard® debit, STAR®, Interlink®, NYCE®, Maestro®, PULSE®, SHAZAM®, etc.). In order for acquirers and/or merchants to have the flexibility of choosing between multiple eligible networks (e.g., signature, debit, PIN, etc., or any combination thereof) for routing a transaction, and further for allowing multiple "products" (e.g., a credit card, a debit card, a store card, etc.) to be associated with one account, it may require BIN tables to be of enormous size and require frequent updates.

As a result, in some instances, it may require significant time to search a BIN table for a pending transaction, thus adding delay to something (i.e., financial transaction processing) that is supposed to be nearly instantaneous. For example, sometimes these larger and larger BIN tables do not completely fit in memory (e.g., RAM) that is "close" to the processor, and thus portions of the BIN tables may need to be repeatedly brought into memory from a "further" away memory such as a solid state or magnetic storage device, which is a relatively slow operation. Moreover, performing frequent updates to these BIN tables also takes longer and longer to perform and continually requires additional computing resources (e.g., processing resources, network resources, etc.), which can delay or negatively impact the "regular" workload of financial transaction processing.

Accordingly, systems, methods, apparatuses, and computer-readable media are described herein for implementing another approach to using tokenization with BIN table routing. According to some embodiments, a token BIN value is associated with multiple payment processing networks that are eligible to route transactions for the payment account of the transaction. In one embodiment, a token BIN translation table is utilized that includes one or more entries. Each entry maps a token BIN value to one or more payment processing networks eligible for processing transactions for that account. Thus, in some embodiments, a token BIN may be "globally" associated with a specific combination of payment processing networks and purposefully selected for inclusion within a token based upon the desired combination of networks. Thus, in some embodiments a merchant and/or acquirer receiving a transaction with a token BIN will have the flexibility to route the transaction to an eligible network from the combination of networks corresponding to that token BIN.

According to some embodiments, token BINs (i.e., token issuer identifiers) are configured from a global, system-wide perspective to allow for routing logic to be "embedded" within tokens themselves. Thus, token BINs may be associated with particular combinations of networks that are eligible to route transactions. Based upon these configured associations, token BINs may be purposefully identified and selected for inclusion within a token BIN based upon the desired combinations of networks that are to be made eligible to route transactions using that token BIN. Accordingly, routing "logic" is thus embedded directly within the token itself in the form of this purposefully selected token BIN, and entities involved in routing such transactions (e.g., acquirer computers, merchant computers, payment network computers, etc.) are able to determine the routing option(s) based upon the received token BIN itself. Additionally, this process does not impact other routing operations and transaction processing performed by the entities in the entire system, as transactions may proceed as they typically do (e.g., an issuer and/or a selected processing network may, upon receipt of transaction information, perform a de-tokenization process to reveal the actual PAN, perform risk analysis procedures, determine a result/decision for the transaction to be included within a payment authorization response message, etc.).

In some embodiments, a single token BIN translation table entry may identify, for a token BIN, multiple payment processing networks that are eligible to process transactions for using that token BIN. The multiple payment processing networks may include both credit processing networks, debit processing networks, or other types of processing networks (e.g., prepaid account payment processing networks, hybrid networks for both credit and debit, etc.). In some embodiments, a token BIN may be associated with multiple types of networks (e.g., debit networks, credit networks, and prepaid networks), and/or multiple networks of a particular type (e.g., multiple credit networks).

In some embodiments, some or all of the token BIN translation table entries further include account attributes associated with the account associated with the token and thus, the utilized token BIN. The account attributes may identify one or more "product types" (e.g., particular card types or card "products") associated with the account or card, and thus the entity utilizing the token BIN translation table may instantly determine the exact configuration (e.g., which products are associated with that card or account) of the payment card and/or account (instead of needing to develop some sort of determination logic to infer or otherwise determine this information).

In some embodiments, based purely upon the entries of the token BIN translation table, the entity utilizing the table (e.g., an acquiring bank, a merchant, and/or a processing network that may receive transaction information but be required to forward it to the "proper" network of record) can programmatically determine which of the payment processing networks are able to process transaction information for different verification schemes. In some embodiments, one or more verification schemes (or "cardholder verification schemes") are defined and associated with a corresponding one or more payment processing networks within the token BIN translation table. A verification scheme identifies which, if any, method of verifying the identity of the associated user (i.e., the user presenting a physical or virtual payment card or otherwise providing payment for a transaction). For example, an illustrative but non-exhaustive list of verification schemes includes "signature" (e.g., where the user provides a signature at the time of purchase), "PIN" (e.g., where the user enters a PIN at the time of purchase), "biometric" (e.g., where a user provides biometric data for verification), "no signature" (e.g., where a user provides no PIN or signature, and may instead be verified in another way), biometric, voice authentication, triangulation (e.g., of multiple but unique characteristics of the consumer and their payment credentials), challenge-response, two-factor (or multi-factor) verification, etc.

Accordingly, embodiments of the invention allow computing devices to constrain the size of necessary transaction routing tables via use of token BIN translation tables that associate multiple eligible payment processing networks with one token BIN. Thus, memory and processor usage is greatly reduced and the system thus provides excellent scaling with increased traffic and allows for additional applications/processes to run without jeopardizing transaction routing performance of the implementing computing devices. Accordingly, embodiments can allow for flexible routing (e.g., allowing for the choice between multiple credit and/or debit networks) without the significant memory, processing, or network overhead involved in previous approaches that required huge numbers of routing table entries and frequent, bandwidth consuming, disruptive update processes. Moreover, in some embodiments, the logic required to be implemented for making routing decisions is greatly simplified (and thus, the size and complexity of the underlying code is greatly reduced) as nearly all information required for decision making purposes is self-contained within the token BIN translation table itself.

Prior to discussing further embodiments of the invention with respect to the figures, a description of some additional terminology is presented to assist with the understanding this disclosure.

As used herein, the term "comprising" is not intended to be limiting, but may be a transitional term synonymous with "including," "containing," or "characterized by." The term "comprising" may thereby be inclusive or open-ended and does not exclude additional, non-recited elements or method steps when used in a claim. For instance, in describing a method, "comprising" indicates that the claim is open-ended and allows for additional steps. In describing a device, "comprising" may mean that a named element(s) may be essential for an embodiment, but other elements may be added and still form a construct within the scope of a claim. In contrast, the transitional phrase "consisting of" excludes any element, step, or ingredient not specified in a claim. This is consistent with the use of the term throughout the specification.

In the following description and claims, the terms "coupled" and "connected," may be used. The term "coupled" may be used to indicate that two or more elements, which may or may not be in direct physical or electrical contact with each other, co-operate or interact with each other. The term "connected" may be used to indicate the establishment of communication between two or more elements that are coupled with each other.

As used herein, a "mobile device" may comprise any electronic and/or communication device that may be transported and operated by a user, which may also provide remote communication capabilities with resources coupled to one or more networks. Examples of mobile devices include mobile phones (e.g. cellular phones), personal digital assistants (PDAs), tablet computers, net books, laptop computers, personal music players, hand-held electronic reading devices, wearable computing devices, etc.

A "server computer" may be a powerful computer or two or more computers. For example, the server computer can be a large mainframe, a minicomputer cluster, or a group of servers functioning as a unit. In one example, the server computer may be a database server coupled to a web server. Server computers often execute server applications that act as a server in client-server interactions, including but not limited to database server applications, web server applications, application server applications, etc.

A "user" may be an entity, such as, an individual that may be associated with one or more payment accounts and/or mobile devices.

A "payment processing network" may include data processing subsystems, networks, and operations used to support and deliver certificate authority services, authorization services, exception file services, and clearing and settlement services. An exemplary payment processing network may include VisaNet™. Payment processing networks, such as VisaNet™, may be able to process credit card transactions, debit card transactions, and/or other types of commercial transactions. The payment processing network may include one or more server computers. The payment processing network may use any suitable wired or wireless network, including the Internet.

As used herein, payment or purchase "transaction data/information" may refer to any information corresponding to or describing purchases, orders, invoices, payments involving goods, items, services, and/or the like, and may include, but is not limited to, a purchase amount, a merchant identifier, description code (e.g., NAICS: North American Industry Classification System) associated with purchased items, cost of purchased items, and transactions as well as descriptions of purchased items, purchase dates, purchase amounts, indications of payments accounts used, indications of whether purchases were made online, confirmation numbers, order numbers, cancellation numbers, shipment status updates (e.g., order being processed, shipped, delivered, on back order, etc.), delivery tracking numbers, cancellation notices, updates, and/or the like.

As used herein, a "payment account" (which may be associated with one or more payment devices) may refer to any suitable payment account including a credit card account, a checking account, a prepaid account, etc.

As used herein, an "account identifier" may refer to a value that uniquely identifies a payment account, which may be a payment account involved in a transaction. An account identifier may be a Primary Account Number (PAN) of an account, and may be defined according to ISO/IEC 7812. Thus, some account identifiers may be numeric values, and have 16, 17, 18, or 19 digits, for example. An account identifier may also include alphanumeric values, and may include only numeric digits, only alphabetic characters (possibly including other symbols such as punctuation and mathematical symbols), or a combination of both numeric digits and alphabetic characters. Of course, other types of representations other than numeric digits and alphabetic characters may also be used within an account identifier. An account identifier may include one or more of an issuer identifier, an individual account identifier, and a check digit.

As used herein, an "issuer identifier" may refer to a value that identifies a bank or entity that issued a payment account. For example, an issuer identifier may be a Bank Identification Number (BIN) or an Issuer Identification Number (IIN), and may include only numeric digits, only alphabetic characters, or combinations thereof. An issuer identifier may include six values/characters.

FIG. 1 illustrates a block diagram of entities in a payment transaction system 100 employing multi-network token BIN routing according to an embodiment of the invention. This depicted payment transaction system 100 includes a user (not illustrated herein), optionally a payment device 103 of the user, optionally a user device 112 (e.g., a mobile device such as a cellular telephone), an access device 102, a merchant computer 104, an acquirer computer 106 implementing a transaction routing module 116, multiple payment processing networks 110A-110N, an issuer computer 118, and optionally a third party computer 124. In this depicted system, one or more of the payment processing networks 110A-110N and/or one or more issuer computers 118 (others not illustrated for the sake of clarity) and/or a third party computer 124 (e.g., a standards organization) may "publish" 160 a token BIN translation table 108 or entries of the token BIN translation table 108, which is downloaded and stored (or otherwise accessed, such as via API calls) by the transaction routing module 116.

Throughout this description, the use of placeholder characters (e.g., the "N" in payment processing network 110N) is not to be construed as representing a particular set value. Thus, the "N" may indicate that there are five total payment processing networks, fifteen total payment processing networks, fifty total payment processing networks, etc.

The system 100 comprises a user who may operate a user device 112. The user may use the mobile device 112 to conduct a financial transaction (e.g., perform a payment transaction) at an access device 102 that itself is communicatively coupled with a merchant computer 104. The user may also use a payment device 103 at the access device 102 (e.g., "swipe" or present the payment device 103) to conduct the financial transaction. Merchant computer 104 may be connected, via one or more communication networks, to acquirer computer 106. Acquirer computer 106 may itself be communicatively coupled with one or more issuer computers (e.g., issuer computer 118) via one or more payment processing networks (e.g., network 110A-network 110N). Of course, some or all of these entities depicted as communicatively coupled may be connected via one or more communication networks or may be directly connected.

As used herein, a "merchant" is typically an entity that engages in transactions and may sell goods and/or services. An "issuer" may typically refer to a business entity (e.g., a bank) that maintains financial accounts for users and may issue payment credentials to be stored on a user device 112 (e.g., a cellular telephone, smart card, tablet, laptop, etc.) of a user. An "acquirer" is typically a business entity (e.g., a bank) that has a business relationship with a particular merchant or other entity. Some entities can perform both issuer and acquirer functions, and some embodiments may encompass such single entity issuer-acquirers. Each of the entities (e.g., merchant computer 104, acquirer computer 106, payment processing networks 110A-110N, and issuer computer 118, third party computer 124) may comprise one or more computer apparatuses to enable communications or to perform one or more of the functions described herein.

As used herein, a "payment device" 103 may refer to any device that may be used to conduct a financial transaction, such as to provide payment information to a merchant. A payment device may be in any suitable form. For example, suitable payment devices include, but are not limited to, smart cards, magnetic stripe cards, keychain devices (such as the Speedpass™ commercially available from ExxonMobil Corp.), cellular phones, personal digital assistants (PDAs), pagers, payment cards, security cards, access cards, smart media, transponders, 2-D barcodes, an electronic or digital wallet, and the like. Such devices can operate in either a contact or contactless mode. In some configurations, a payment device 103 directly interacts with an access device 102 (i.e., without the use of any other device and/or network), but in some configurations payment device 103 communicates with the access device 102 using an intermediary device and/or a communication network. User device 112 may be a mobile device (as described above) that, in some embodiments, may be thought of as a type of payment device (e.g., payment device 103). For example, a user device 112 may include, but is not limited to, a cellular phone, laptop, tablet, wearable computing device, etc., and may interact with an access device 102 (e.g., using NFC) and/or merchant computer 104 (e.g., via the Internet to access a website or utilize an application provided by merchant computer 104) to initiate and/or conduct a financial transaction. The user device 112 may also utilize a payment application 114 including account credentials provisioned by (or, in part by) issuer computer 118 during the transaction.

In some embodiments, the payment processing networks 110A-110N may conduct transactions in substantially real-time (e.g., in fewer than a few seconds or fractions of a second). The payment processing networks 110A-110N may include one or more server computers (as described above), and may use any suitable wired or wireless network, including the Internet.

In an exemplary purchase transaction, the user purchases a good or service from a merchant using a user device 112 (e.g., a mobile phone). The user's device 112 can interact with an access device 102 at a merchant associated with merchant computer 104. For example, the user may tap the user device 112 against an NFC reader in the access device 102. Alternatively, the user may provide payment details to the merchant electronically, such using a digital wallet (e.g., payment application 114) or through an online transaction, and these details may be provided to the merchant via the access device 102. In some purchase transactions the user device 112 may not utilize an access device 102, and may instead "directly" interact with a merchant computer 104 (e.g., a computing system providing a merchant website or "backend" services for a merchant application executing on the user device 112). In these examples, the merchant computer 104 may be thought of as implementing a virtual access device.

To cause the financial transaction to be performed, transaction information 152 (including a token) such as an authorization request message may be generated by the access device 102 (or virtual access device, which may be at merchant computer 104) and be forwarded to the acquirer computer 106.

In some embodiments, the token is "pre-generated" and stored by the payment device 103 or user device 112, and thus is provided to the access device 102 or merchant computer 104 for inclusion within the transaction information 152. In some embodiments, though, the token is generated "on-the-fly" (or, on demand for a particular transaction or transactions) by the payment device 103 (e.g., when payment device 103 comprises a chipcard), user device 112 (e.g., when the payment application 114 includes token generation logic), by the access device 102 using a provided PAN, or by the merchant computer 104 using a provided PAN. Thus, the acquirer computer 106 receives transaction information 152, such as an authentication request message, that includes a token (and thus, a token BIN).

The acquirer computer 106 is a system of an acquirer (as discussed above) providing an account of the merchant, which will ultimately receive the funds for the transaction from an issuer providing the user's account. The transaction information 152, or "authorization request message", received by the acquirer computer 106 may be an electronic message that is sent via a payment processing network 110A and/or an issuer of a payment card (e.g., issuer computer 118) to request authorization for a transaction. An authorization request message, according to some embodiments, may comply with a message type defined by the International Organization for Standardization (ISO) 8583 standard, which is a standard for systems that exchange electronic transaction information associated with payments made by users using a payment device 103 (which could be a user device 112) or payment account. In addition to including a token, an authorization request message may also comprise additional data elements corresponding to "identification information" including, by way of example only: a service code, a CVV (card verification value), a dCVV (dynamic card verification value), an expiration date, a cryptogram, etc. An authorization request message may also include other transaction information, such as any information associated with a current transaction, such as the transaction amount, merchant identifier, merchant location, etc., as well as any other information that may be utilized in determining whether to identify and/or authorize a transaction. The authorization request message may also include other information such as an identifier of the access device 102 that generated the authorization request message, information about the location of the access device 102, etc.

Typically, an authorization request message will include a field for a primary account number (PAN) associated with an account of the user that was provided by the user device 112 (or payment device 103), though this PAN field will, in some embodiments, include the token instead of the actual PAN.

After receiving the transaction information 152 (which may or may not be an authorization request message), the acquirer computer 104 will seek to "route" the transaction information by sending transaction information 156 (which may or may not be an authorization request message) to a particular payment processing network (e.g., payment processing network 110B). This transaction information 156, in some embodiments, includes some or all of the received transaction information 152, and in some embodiments, the transaction information 156 may include additional information that may be generated (or separately received) by the acquirer computer 104. For example, in some embodiments the acquirer computer 104 may perform its own verification review process for the transaction, and may include, with the transaction information 156, the results of the verification review process. As one example, a verification review process may determine a perceived risk of the transaction based upon the received transaction information 152 (e.g., based upon authentication data), and a resulting score may be generated and included with the forwarded transaction information 156.

In some embodiments, the transaction routing module 116 of the acquirer computer 106 identifies the token BIN within the token received with the transaction information 152, and uses this identified token BIN to determine which (of possibly multiple) payment processing networks 110A-110N to route the transaction information 156 through. In some embodiments, this includes using the token BIN as a sort of a "key" or "index" into the token BIN translation table 108 to identify an entry of the token BIN translation table 108. In an embodiment, the entry identifies one or more of the payment processing networks 110A-110N that are deemed eligible to route the transaction. In some embodiments, the entry further defines verification parameters associated with the identified payment processing networks 110A-110N. In some embodiments, the entry further identifies one or more account attributes 208 (such as product type attributes 206 used by the account(s) having that particular token BIN).

With this data from the identified entry of the token BIN translation table 108, the transaction routing module 116 is able to determine which of the payment processing networks 110A-110N to route the transaction information 156 to. In some embodiments, this determination is based upon information within the received transaction information 152, such as an indication of whether the transaction was submitted (e.g., by the user, by the access device 102, etc.) as a debit or credit transaction and/or whether it was submitted using a provided PIN value, a signature, etc. Determining such logic for selecting between the identified eligible payment processing networks 110A-110N is thus highly configurable based upon the preferences of the particular acquirer, and is easy to implement because of the large amount of information explicitly provided via the identified token BIN translation table 108 entry. Thus, the particular logic used is allowed to be tremendously flexible and may be implemented according to the desires of the particular acquirer 106 by one of ordinary skill in the art.

The payment processing network 105 then forwards the transaction information 158 (including a token, or perhaps including a PAN that was de-tokenized by that network or a token service provider, for example) to the issuer computer 118 associated with the issuer of the user's account.

After the issuer computer 118 receives the transaction information 158 (e.g., an authorization request message), the issuer computer 118 sends transaction response information (e.g., an authorization response message) back to the payment processing network to indicate whether or not the current transaction is authorized. Such transaction response information is not illustrated herein to avoid obscuring aspects of some embodiments, but may be easily implemented by those of ordinary skill in the art. An "authorization response message" may be an electronic message reply to an authorization request message generated by an issuing financial institution or a payment processing network, and may comply with the ISO 8583 standard. The authorization response message may include, by way of example only, one or more of the following status indicators: Approval—transaction was approved; Decline—transaction was not approved; or Call Center—response pending more information, the merchant must call the toll-free authorization phone number. The authorization response message may also include an authorization code, which may be a code that an issuer returns in response to an authorization request message in an electronic message (either directly or through the payment processing network) to the merchant's access device 102 (e.g., a POS terminal) that indicates an approval of a transaction, and may serve as proof of authorization.

The payment processing network (e.g., network 110A) receives the transaction response information (e.g., authorization response message) from the issuer computer 106 and transmits it back to the acquirer computer 106. The acquirer computer 106 then sends the transaction response information (e.g., authorization response message) back to the merchant computer 104, where the merchant can determine whether to proceed with the transaction. In some embodiments, such as when a fraud rule is triggered by the payment processing network, the payment processing network (e.g., network 110A) may itself decline a transaction previously authorized by issuer computer 118. Regardless, after the merchant computer 104 receives the transaction response information (e.g., authorization response message), the access device 102 may then provide a response message for the user. The response message may be displayed by a display device (e.g., a display device that is part of or coupled to the access device 102), printed out on a receipt, communicated to the user's device 112, etc. Alternately, if the transaction is an online transaction (e.g., via a website or application), the merchant computer 104 may provide a web page, display module, or other indication of the transaction response to the user device 112.

At the end of the day, a normal clearing and settlement process may be conducted by the utilized payment processing network 110A. A clearing process is a process of exchanging financial details between an acquirer and an issuer to facilitate posting to a user's payment account and reconciliation of the user's settlement position. However, it should be noted that embodiments of the invention are not limited to such a single settlement process.

As described above, techniques described herein uniquely enable multi-network routing (i.e., allowing for multiple eligible payment processing networks) for transactions utilizing tokens (and thus, token BINs) without employing the use of translation tables with large memory requirements, frequent updates, large per-transaction processing requirements, etc. Moreover, techniques described herein allow for acquirers to easily and simply develop lightweight and customized routing logic (e.g., via transaction routing module 116) that can heavily rely upon the token BIN translation table 108 data.

Figure 2:
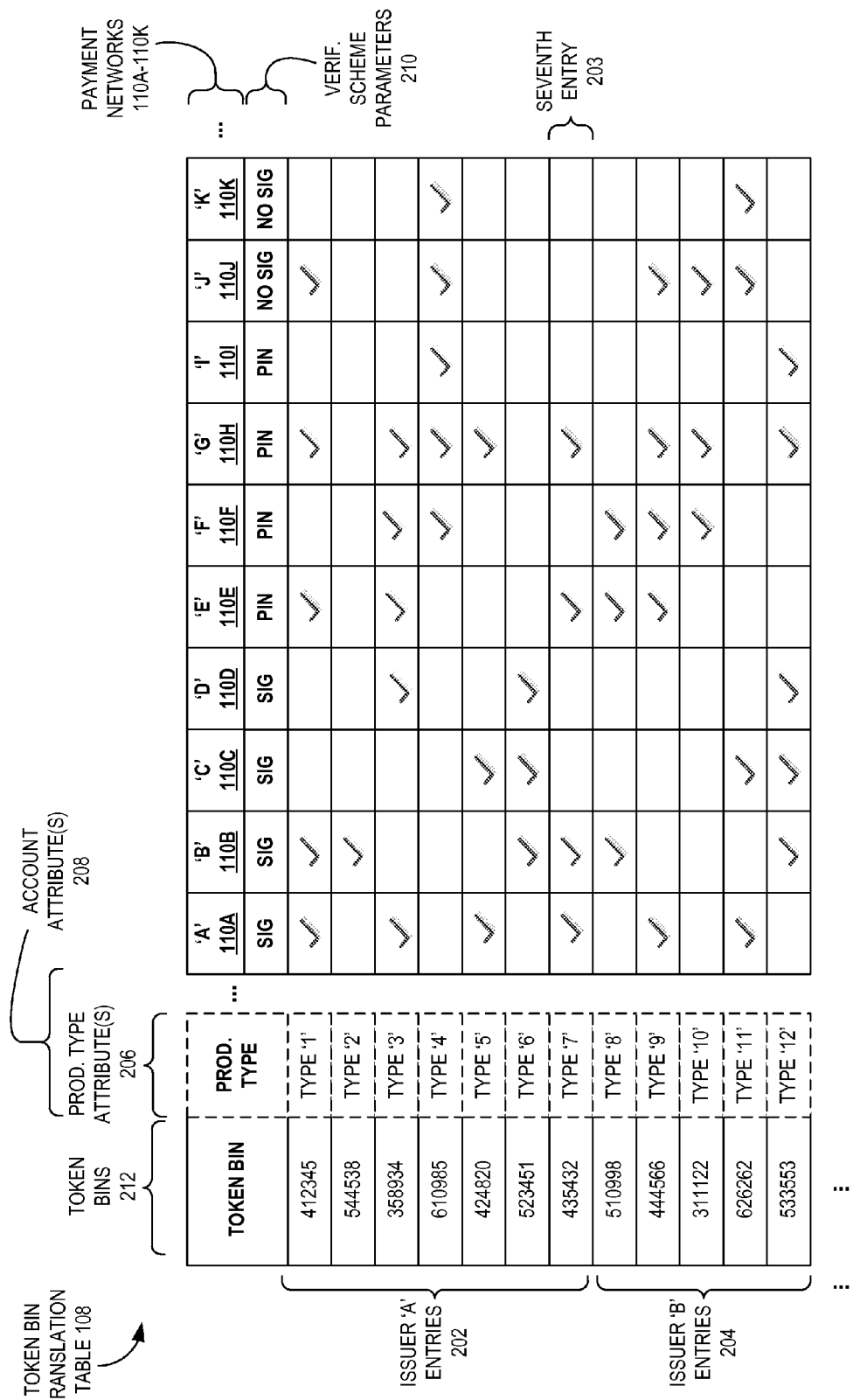
FIG. 2 illustrates a token BIN translation table including multiple entries associated token BINs with payment processing networks and verification parameters according to an embodiment of the invention.

Having discussed some of the entities involved in a payment system 100 utilizing a token BIN translation table 108, we now turn to an exemplary token BIN translation table 108. FIG. 2 illustrates a token BIN translation table 108 including multiple entries that associate token BINs with payment processing networks and verification parameters according to an embodiment of the invention. The token BIN translation table 108, in some embodiments, is stored and accessed by the acquirer computer 106 via its transaction routing module 116. In some embodiments, the token BIN translation table 108 is stored at one or more of the merchant computer 104, the acquirer computer 106, the third party computer 124, any of the networks 110A-110N, and the issuer computer 118.

The illustrated token BIN translation table 108 is shown as including twelve entries, ten different payment processing networks 110A-110K and verification scheme parameters 210, one set of account attributes 208 (i.e., product type attributes 206), and twelve types of product type attributes 206. Of course, more or fewer of these elements may be used in other token BIN translation tables 108 depending upon the operating environment and the particular embodiment.

The illustrated token BIN translation table 108 includes a first set of entries 202 associated with a first issuer 'A', and a second set of entries 204 associated with a second issuer 'B'. In some embodiments, each of these entries are directly "published" 160 by the respective issuer, but in some embodiments these entries are published 160 by a common entity, such as an external organization (e.g., third party computer 124) or one of the issuers (e.g., issuer computer 118). In some embodiments, these entities may be published 160 by one or more of the payment processing networks 110A-110N themselves, or may be published 160 by combinations of the payment processing networks 110A-110N, issuers, and third parties.

This token BIN translation table 108 includes a first column of token BIN values 212—some of which 202 are associated with a first issuer, and some of which 204 are associated with a second issuer. In this embodiment, each token BIN comprises a six digit value. Accordingly, the transaction routing module 116, upon receipt of transaction information including a token, will identify the token BIN portion of the token, and may use it as an index into the token BIN translation table 108 by searching for a "matching" entry.

Although this depiction shows that each entry includes a "compete" token BIN, in some embodiments "ranges" (or even non-consecutive groupings) of token BINs may be associated with one entry. Thus, a token BIN may be a "partial" token BIN and/or include placeholder values (i.e., an asterisk representing a wildcard, for example). For example, an entry in the token BIN 212 column may represent all token BINs between 412010 and 412060 (and perhaps be represented as 41201*-41206*), or all token BINs between 410000 and 419999 (perhaps being represented as 41*), or a grouping of two token BINs (perhaps represented as 412345;412456). Thus, one entry may correspond to exactly one token BIN, or correspond to potentially many token BINs.

Based upon identifying a matching entry using the received token BIN, one or more payment processing networks 110A-110K configured as eligible to process transactions for that particular BIN may be identified. For example, the seventh entry 203 indicates that four networks are configured as eligible for process transactions for the token BIN of "435432": payment processing network 'A' 110A, payment processing network 'B' 110B, payment processing network 'E' 110E, and payment processing network 'G' 110G. In this depicted example, these payment processing networks of the seventh entry 203 include two payment processing networks having a "signature" verification scheme parameter 210 (i.e., networks 'A' 110A and 'B' 110B) and two payment processing networks having a "PIN" verification scheme parameter 210 (i.e., networks 'E' 110E and 'G' 110G). Thus, in some embodiments, the transaction routing module 116 may be flexibly configured with logic necessary to select one of these networks according to the implementing acquirer's requirements. For example, assuming this seventh entry 203 is the identified entry for a transaction, the logic may be configured to identify which, if any, verification scheme was employed when the transaction was initiated (by the user and/or access device 102 and/or merchant computer 104) based upon the received transaction information, which may include an identifier of the utilized verification scheme, and then select (based upon the acquirer's requirements/preferences) between the eligible payment processing networks with a corresponding verification scheme parameter 210 indicator in the token BIN translation table 108 matching that particular used scheme.

In some embodiments, the decision between the eligible payment processing networks 110A-110K for an entry may be made based upon the account attributes 208 stipulated in the token BIN translation table 108. For example, in an embodiment including product type attributes 206 in the token BIN translation table 108, the logic may be configured to select different networks based upon the value of that entry's product type attributes 206 (represented herein as TYPE '1', etc., which serves as a placeholder for any type of identifier of one or more product type attributes).

In some embodiments, a product type may identify an issuer of the card/account (e.g., "Visa®"). However, a product type may further specify one or more particular card products associated with card/account. Over the years, card issuers have developed different card (or "product") types to more effectively target a variety of customer segments to serve customer needs and increase card usage at the same time. For Visa® credit cards, for example, product types may include Visa® Traditional, Visa® Traditional Rewards, Visa® Signature, Visa® Signature Preferred, among many others. Thus, in some embodiments, one or more of the entries of the token BIN translation table 108 may identify one—or more—product types of the associated card/account as the product type attributes 206.

Of course, other account attributes may also be identified or stored by the entries of the token BIN translation table 108. For example, the entries may identify account enhancement attributes (not illustrated) for the corresponding cards/accounts using that particular token BIN. In some embodiments, the cards/accounts may have a different set of enhancement features assigned to it. Enhancement features are services or goods that a card issuer may provide in addition to processing purchase transactions of the cardholders. Examples of enhancement features include zero liability from loss of card, auto rental collision damage waiver, emergency cash disbursement and card replacement, lost/stolen card reporting, extra warranty period for products, travel accident insurance, lost luggage reimbursement, roadside dispatch, cash back and frequent flyer mileage. Such enhancement features may be identified by a set of account enhancement attributes in the token BIN translation table 108, and may be used within the eligible payment processing network selection logic for the purposes of selecting which eligible payment processing network for a particular entry is to be used to route the transaction information for a particular transaction.

Although this table is depicted is a single data structure, in some embodiments the table is made up of multiple data structures. As one example, the token BINs 212, in some embodiments, may not be literally stored in a data structure. Instead, for example, a hash table (or "hash map" or similar data structure) might be used in some embodiments to "hash" a received token BIN to identify an entry of the token BIN translation table. Alternatively, a separate "mapping" structure may store the actual token BINs 212 and map them to identifiers (e.g., a memory address, for example) of entries in one or more separate data structures identifying the account attributes 208 and/or eligible payment processing networks 110A-110K and/or verification scheme parameters 210.

Similarly, although checkmarks are depicted herein for ease of understanding, these checkmarks may, in some embodiments, be stored as binary values (indicating a 0 or 1, which may be referenced as a True or False) within a table. In some embodiments, the "eligible" payment processing networks 110A-110K for an entry may instead be stored as a list of network identifiers. For example, the first depicted entry (identifying networks 110A, 110B, 110E, 110H, and 110J as eligible networks) may have a set of eligible payment processing networks 110A-110K represented as "{A, B, E, H, J}", where these elements may be any type of identifier of a respective payment processing network. Thus, the particular depiction of this illustrative token BIN translation table 108 presents just one of many possible implementations of embodiments described herein, and many variants may be readily determined and implemented by those of skill in the art using this description provided herein.

Figure 3:
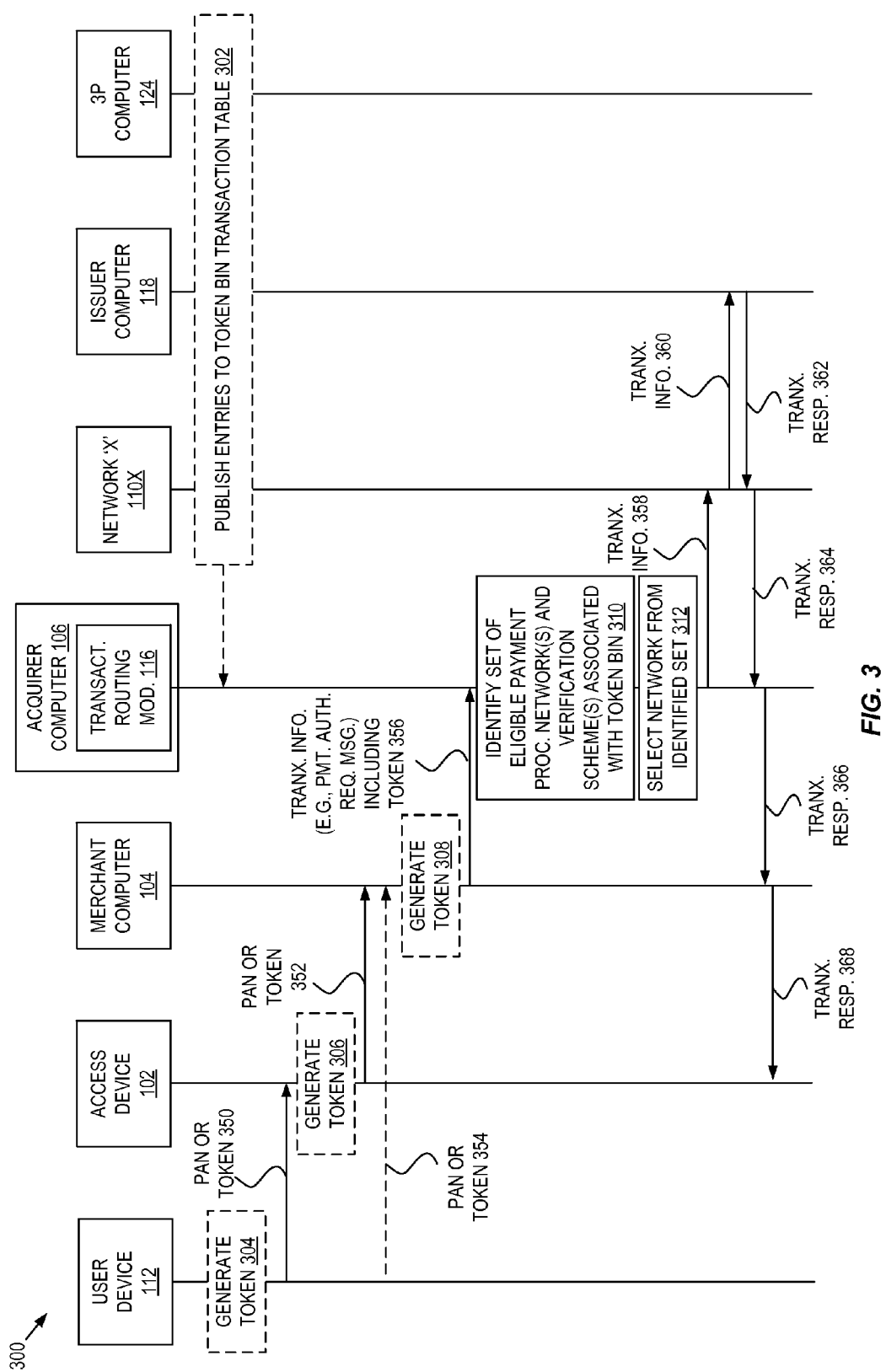
FIG. 3 illustrates a combined sequence and flow diagram depicting transaction routing using a token BIN translation table according to an embodiment of the invention.

An exemplary flow for utilizing token BIN translation table in multi-network token BIN routing is now presented. FIG. 3 illustrates a combined sequence and flow diagram 300 depicting transaction routing using a token BIN translation table according to an embodiment of the invention. FIG. 3 depicts some possible actions performed by and messages exchanged between various entities in a payment system, which includes a user device 112, access device 102, merchant computer 104, acquirer computer 106 (with a transaction routing module 116), a payment processing network 'X' 110X, an issuer computer 118, and a third party computer 124. Of course, this diagram illustrates just one embodiment of many possible systems and configurations of other embodiments. As one example, user device 112 may instead be a payment device 103 in some embodiments. As another example, the third party computer 124 may not exist in some embodiments. Thus, this example is intended to be illustrative of just one of many embodiments.

The embodiment of this diagram 300 may include one— or more—of the network 'X' 110X (and possibly, other of the payment processing networks 110A-110N), the issuer computer 118 (and possibly, other issuer computers of the same issuer or different issuers), and the third party computer 124 publishing 302 entries to the token BIN transaction table. For example, in some embodiments, one of the issuers (e.g., via issuer computer 118) may configure a token BIN to be associated with one or more payment processing networks, and may cause an entry for that token BIN to be "published" at block 302. In some embodiments, this publishing 302 includes sending data for the entry (e.g., the token BIN or token BIN range, eligible payment processing network identifiers, associated verification parameters, account attributes, etc.) to another computing device. For example, this data may be sent to the third party computer 124, which itself will provide entry data for token BIN translation tables to other computing systems, such as one or more acquirer computers 106. In other embodiments, though, the publishing 302 may include directly transmitting data for the entry to an acquirer computer 106, which may or may not occur in response to a request for token BIN translation table entry data received from the acquirer computer 106. Of course, other configurations are possible, including one or more payment processing networks 110A-110N "publishing" this entry data, and/or the third party computer 124 "publishing" this entry data. Similarly, in some embodiments the token BIN translation table entries may also be utilized by, and thus "published to", the merchant computer 104, one or more of the payment processing networks 110A-110N, one or more issuer computers 118, etc.

At some point, a user initiates a transaction with a merchant, and a token will be used (and possibly generated) for the transaction. This may occur in a variety of ways. For the purposes of this discussion, the user device 112, in some embodiments, is instead a payment device 103.

In some embodiments, the user device 112 provides a token 304 for the transaction. For example, at block 304, the user device 112 may generate a token at block 304 for the particular transaction (or, perhaps, not specific to any one transaction), and provide (via arrow 350) the token to an access device 102, or provide the token at arrow 354 directly to the merchant computer 104. Alternatively, the user device 112 may have a previously provisioned (or generated) token, and may provide that token (at arrow 350) to the access device 102 or (at arrow 354) to the merchant computer 104.

In some embodiments, the access device 102 generates the token (at block 306). For example, the user device 112 may present a PAN (at arrow 350) to the access device 102, which may be configured to, possibly based upon that PAN, generate a token for the transaction, and pass the token (at arrow 352) to the merchant computer 104 for payment processing (along with transaction data).

In some embodiments, though, the user device 112 provides a PAN for the transaction (at arrow 350), and the access device 102 passes that PAN with transaction data (at arrow 352) to the merchant computer 104. The merchant computer 104, then, may be configured to generate a token at block 308 for the transaction.

Moving on, eventually the merchant computer 104, in this depicted embodiment, will be in possession of a token associated with the user's payment account that is to be used for the transaction. At arrow 356, the merchant computer 104 may provide the transaction information—which may be a payment authorization request, for example—to an acquirer computer 106. This transaction information includes the token, and in some embodiments, does not include the PAN of the payment account.

Upon receipt of the transaction information (depicted as arrow 356), the acquirer computer 106 may then, in the depicted embodiment, identify at block 310 a set of eligible payment processing networks and verification parameters associated with the token BIN. In some embodiments, this identification includes identifying the token BIN from the received token, and using the token BIN as an index into a table (or other data structure) identifying one or more eligible payment processing networks that are able to route transactions for that token BIN. In some embodiments, the table (or data structure) further identifies, for each of the identifying one or more eligible payment processing networks, a verification parameter employed for the respective network. Further, in some embodiments, the table (or data structure) further associates, for one or more token BINs, one or more product type attributes for each token BIN, where the product type attributes identify one or more card product types associated with the card/account used the in the transaction and for which the token (and token BIN) is associated with. In some embodiments, the table (or data structure) may comprise a token BIN translation table including a multiple entries, and at least one of the multiple entries identifies multiple eligible payment processing networks that can route transactions associated with the token BIN.

The acquirer computer 106, in this depicted embodiment, selects one payment processing network at block 312 from the identified set of payment processing networks deemed eligible for routing transactions associated with the token BIN (at identified in block 310). In some embodiments, this selection is based at least upon the transaction information received from the merchant computer 104 at arrow 356, which may include an identifier of how the account information (e.g., PAN or token) was received or generated, whether the transaction is an in-person transaction (i.e., the user was physically proximate to the access device 102 or merchant location), whether the user provided a signature or PIN, etc. For example, in some embodiments the acquirer computer 106 may be configured to determine whether the transaction information 356 identifies what type of verification data may have been provided by the user, and select one of the eligible payment processing networks configured with that particular verification scheme. Additionally, this determination, in some embodiments, may be based upon one or more of an expected cost of routing the transaction over the identified eligible networks, a number of previous transactions transmitted over the identified eligible networks, the value of the product type attributes associated with the token BIN, and flexibly, any other factors deemed relevant to the particular implementation and/or acquirer preference.

In some embodiments, the operations of block 310 and block 312 may be performed at once and thus they effectively collapse into a single block. Thus, in some embodiments, the acquirer computer 106 may be configured to immediately select a payment processing network from a set of eligible payment processing networks without needing to distinctly first explicitly identify that set. This may occur, for example, if the acquirer computer 106 queries the token BIN translation table using the token BIN as well as another selection option, such as a defined verification parameter, to possibly identify precisely one eligible payment processing network associated with the token BIN.

When an payment processing network that is eligible to route transactions having the token BIN has been selected, the transaction may occur using "traditional" token-based payment processing operations. For example, the acquirer computer 106 transmits transaction information 358 (which may or may not be the same transaction information received at arrow 356) at arrow 358 to the selected network—here represented by network 'X' 110X. This network 'X' 110X may, based upon the transaction information (e.g., the token) identify the issuer and forward the transaction information—possibly modified, as a result of the network's own risk analysis, for example, or including a PAN resulting from a de-tokenization of the token—at arrow 360 to that issuer. The issuer computer 118, then, may determine whether the transaction may proceed, and will transmit a transaction response message (e.g., a payment authorization response message) at arrow 362 back through the network 110X, to the acquirer computer 106 at arrow 364, to the merchant computer 104 at arrow 366, and to the access device 102 at arrow 368. In some embodiments, some or all of the transaction response messages 362, 364, 366, and 368 are different messages that may include different information, though, in some embodiments, all are related to the transaction and in some way indicate whether the transaction is authorized.

Figure 4:
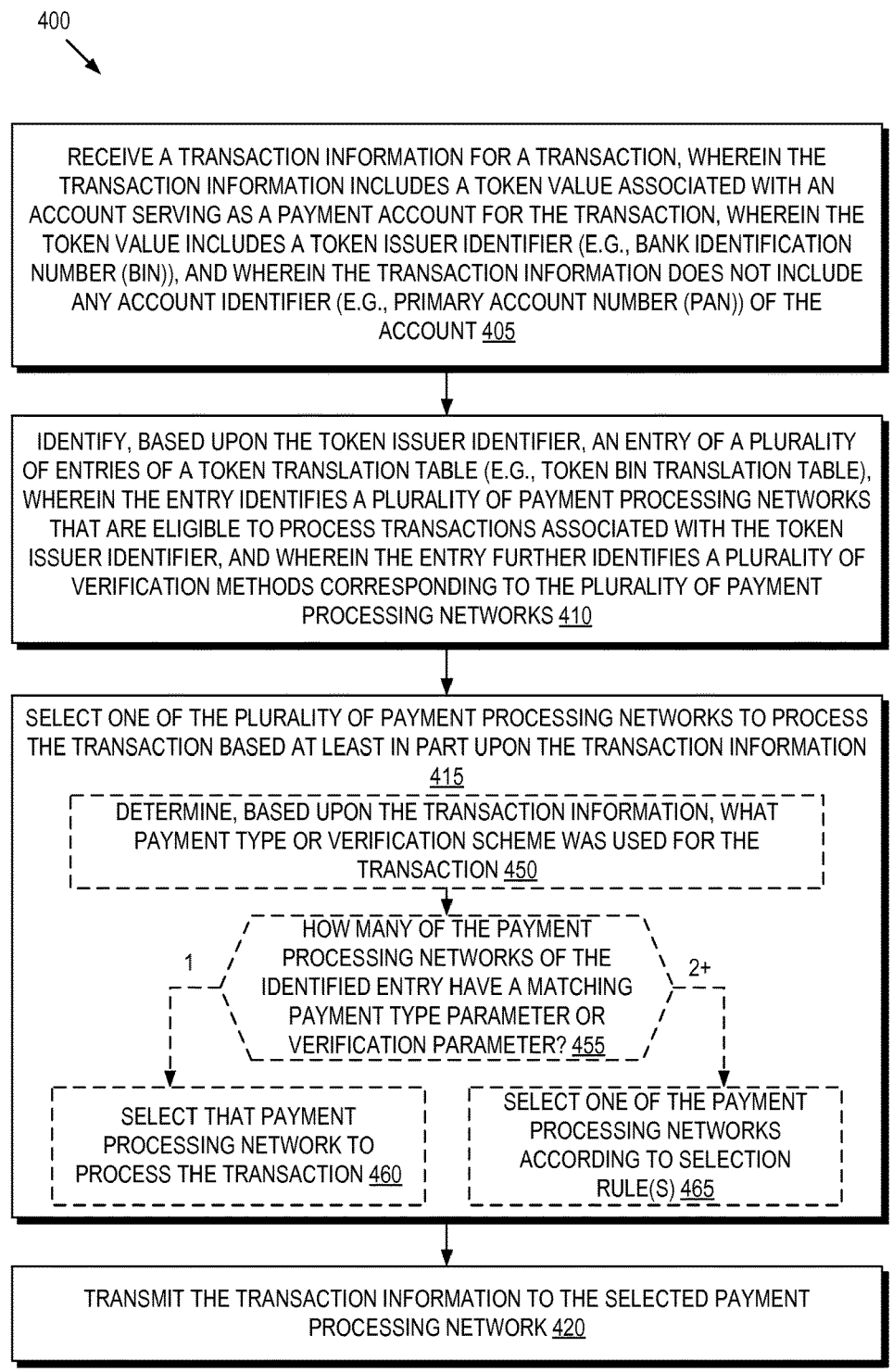
FIG. 4 illustrates a flow in a merchant or acquirer computer for utilizing a token BIN translation table for selecting a payment processing network according to an embodiment of the invention.

FIG. 4 illustrates a flow 400 in a merchant or acquirer computer for utilizing a token translation table (e.g., token BIN translation table) for selecting a payment processing network according to an embodiment. In some embodiments, flow 400 is performed by the transaction routing module 116 of the acquirer computer 106, and in some embodiments the flow 400 is performed by a merchant computer 104.

The flow includes 400, at block 405, receiving transaction information for a transaction. In an embodiment, the transaction information includes a token value associated with an account serving as a payment account for the transaction. The token value includes a token issuer identifier (e.g., a token BIN), and the token information does not include any account identifier (e.g., primary account number (PAN)) of the account 405. In some embodiments, the transaction information comprises a payment authentication request message. In some embodiments, the transaction information was received from a merchant computer, and in some embodiments the merchant computer generated the token based upon an account identifier (e.g., a PAN) provided by the user for the transaction. However, in some embodiments the token was provisioned onto a user device 112 that the user utilized for the transaction, and in some embodiments the user device 112 itself generated the token, and in some embodiments an access device 102 that received an account identifier (e.g., a PAN) for the transaction itself generated the token.

The flow 400 also includes, at block 410, identifying, based upon the token issuer identifier (e.g., token BIN) from the token, an entry of a plurality of entries of a token translation table (e.g., token BIN translation table). The entry identifies a plurality of payment processing networks that are eligible to process transactions associated with the token issuer identifier (e.g., token BIN). The entry further identifies a plurality of verification methods corresponding to the plurality of payment processing networks. In some embodiments one or more of the verification methods is "signature," "PIN," or "no-signature." In some embodiments, the identifying includes using the token issuer identifier as an index into the token translation table to identify the entry.

At block 415, one of the plurality of payment processing networks is selected to process the transaction based at least in part upon the transaction information. In some embodiments, this selection is based upon a verification scheme performed at the time of the initiation of the transaction by the user, and may include, in some embodiments, an indicator within the transaction information identifying whether the user provided a signature, PIN, "no signature", other identity information such as a government issued license, used a chipcard, etc.

For example, in some embodiments, block 415 may include block 450, where the flow 400 includes determining, based upon the transaction information, what payment type or verification scheme was used for the transaction. Then, at decision block 455, the flow continues based upon how many of the payment processing networks of the identified entry have a matching payment type parameter or verification parameter. When there is exactly one matching eligible payment processing network, flow continues to block 460, where that one matching eligible payment processing network is selected to process the transaction. However, when there are more than one of the payment processing networks of the identified entry that have a matching payment type parameter or verification parameter, though, flow continues to block 465, where one of these entries is selected according to one or more defined selection rules. In an embodiment, the selection rules may indicate logic constituting an order for selecting between some or all of the payment processing networks.

The flow 400, at block 420, includes transmitting the transaction information to the selected payment processing network. In some embodiments, the flow 400 further includes receiving a response message (e.g., a payment authorization response message) indicating whether the issuer of the user's account will authorize the transaction.

Figure 5:
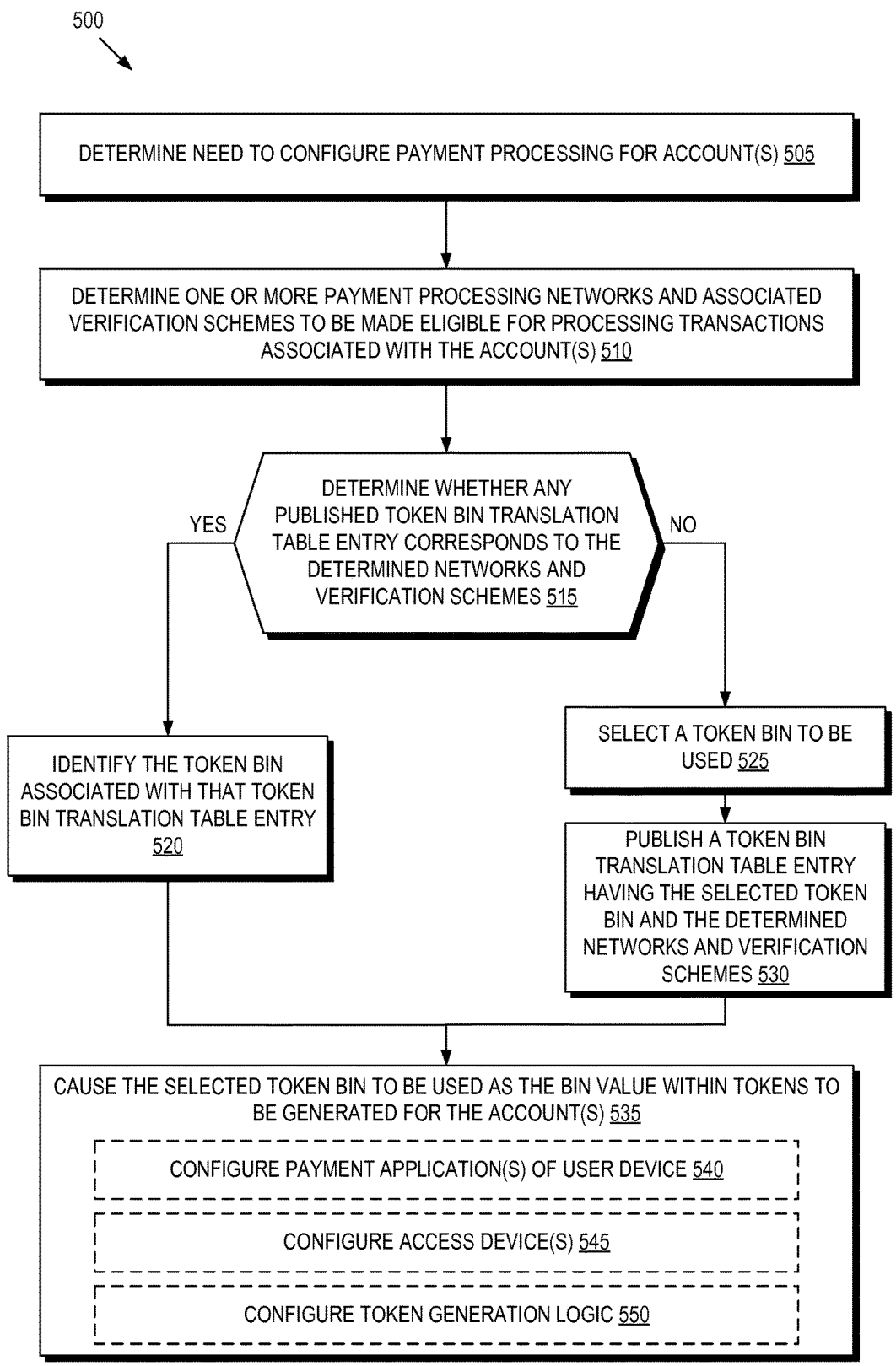
FIG. 5 illustrates a flow for configuring accounts with token BINs based upon eligible payment processing networks and verification parameters according to an embodiment of the invention.

In contrast to the flow 400 of FIG. 4, FIG. 5 illustrates a flow for configuring accounts with token BINs based upon eligible payment processing networks and verification schemes according to an embodiment of the invention. In some embodiments, some or all of these blocks 505-535 may be performed by one or more of a payment processing network (e.g., network 110A), an issuer (e.g., issuer computer 118), and a third party computer 124.

The flow 500 includes, at block 505, determining a need to configure payment processing for one or more accounts. In an embodiment, this occurs responsive to the creation of a new account or the configuration of an account with one or more product types.

At block 510, the flow 500 includes determining one or more payment processing networks and associated verification schemes to be made eligible for processing transactions associated with the account(s). In an embodiment, the one or more payment processing networks and associated verification schemes are identified based upon the product type or types associated with the account.

At decision block 515, the flow 500 includes determining whether any published token BIN translation table entry corresponds to the determined networks and verification schemes. In an embodiment, this block 515 includes searching a token BIN translation table for any entries having exactly the same configuration of determined networks and verification schemes. In some embodiments, block 515 includes searching a token BIN translation table to determine whether any entry includes a same set of product type attributes as are associated with the one or more accounts.

If a table entry is found at block 515, flow continues with block 520, where the token BIN associated with that token BIN translation table entry is identified.

In contrast, if no table entry is found at block 515, flow continues with block 525, where a token BIN is selected to be used for the one or more accounts, and block 530, where a token BIN translation table entry is published for the selected token BIN that has the determined networks and verification parameters.

Regardless of the path, flow continues with block 535, in which the selected token BIN is caused to be used as the BIN value within tokens that will be generated for the one or more accounts. In some embodiments, this includes block 540, where one or more payment applications (e.g., payment application 114) are configured to generate tokens for those accounts using the selected token BIN. In some embodiments, block 535 includes block 545, where one or more access devices (e.g., access device 102) is configured to generate tokens using the selected token BIN upon receipt of PANs associated with those accounts. Further, in some embodiments, block 535 includes block 550, where token generation logic is configured to generate tokens for those accounts. The token generation logic may exist in a variety of locations, including but not limited to token generation module of a token service provider, a credential provisioning server, an account management module of the issuer computer 118, etc.

The various participants and elements described herein may operate one or more computer apparatuses to facilitate the functions described herein. Any of the elements in the above-described FIGS. 1-5, including any servers or databases, may use any suitable number of subsystems to facilitate the functions described herein.

Figure 6:
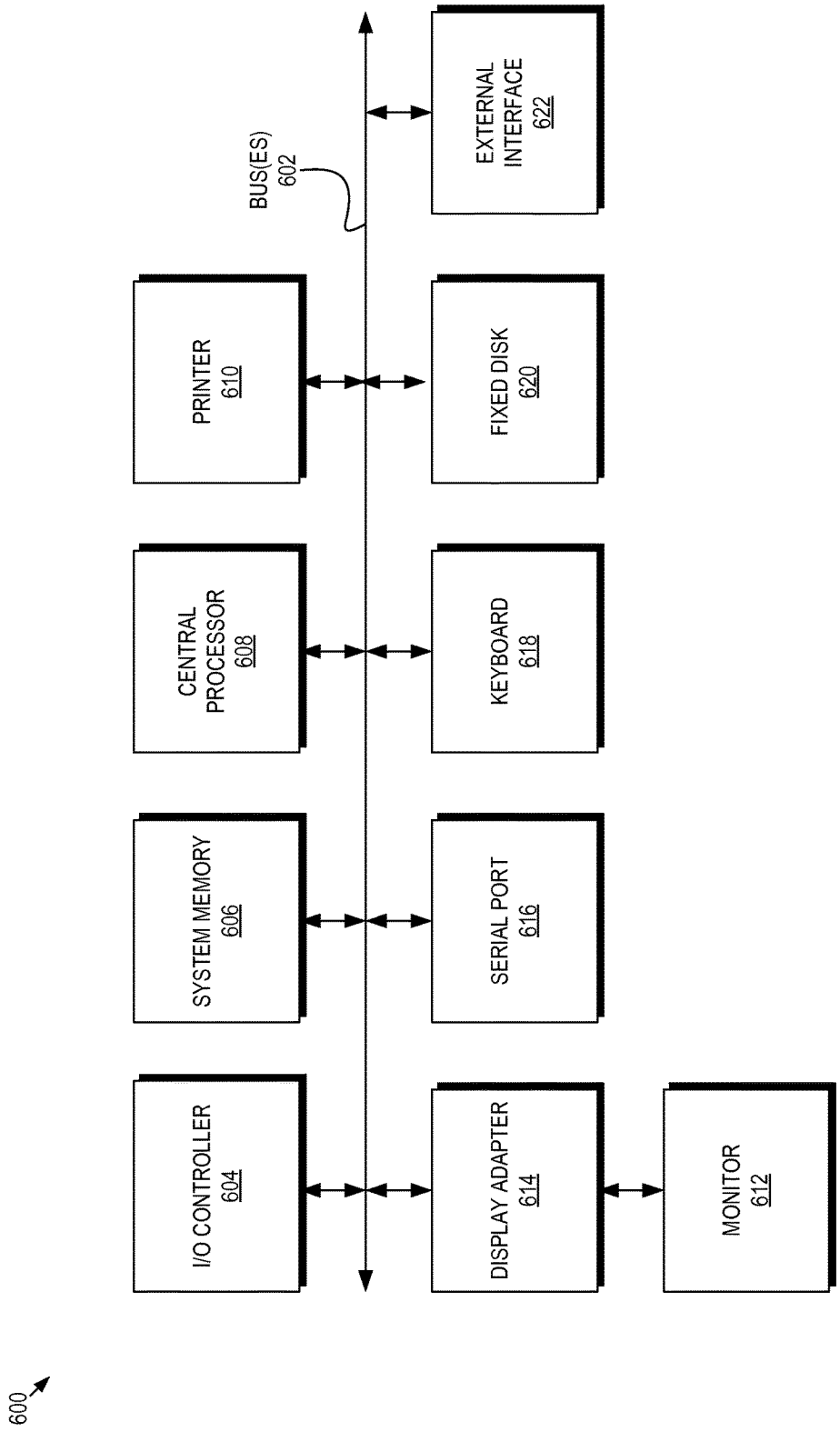
FIG. 6 illustrates a high level block diagram of a computer system that may be used to implement any of the entities or components described herein.

Examples of such subsystems or components are shown in FIG. 6. FIG. 6 illustrates a high level block diagram of a computer system that may be used to implement any of the entities or components described herein. The subsystems shown in FIG. 6 are interconnected via a system bus 602. Additional subsystems include a printer 610, keyboard 618, fixed disk 620, and monitor 612, which may be coupled to display adapter 614. Peripherals and input/output (I/O) devices, which couple to I/O controller 604, can be connected to the computer system by any number of means known in the art, such as a serial port, USB port, IEEE 1394 (i.e., Firewire) port, external Serial Advanced Technology Attachment (eSATA) port, or similar port. For example, serial port 616 or external interface 622 can be used to connect the computer apparatus, through wired or wireless communications, to a wide area network (WAN) such as the Internet, a mouse input device, or a scanner. The interconnection via system bus 602 allows the central processor 608 to communicate with each subsystem and to control the execution of instructions from system memory 606 or the fixed disk 620, as well as the exchange of information between subsystems. The system memory 606 and/or the fixed disk 620 may embody a computer-readable medium. For example, the fixed disk 620 may be implemented, for example, as a hard drive, flash drive (e.g., thumb drive, solid state drive, etc.), optical storage media (e.g., CD-ROM, DVD, Blu-Ray, etc.), or another appropriate storage media device.

As described, the inventive service may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application may be implemented as software code to be executed by a processor using any suitable computer language such as, for example, Java, C, C++, Python, or Perl using, for example, conventional or object-oriented techniques. The software code may be stored as a set of instructions (or commands) on a computer-readable medium, such as a random access memory (RAM), a read-only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network. For example, the set of instructions may be stored by fixed disk 620 and may be read into system memory 606, for example, during runtime of an application or component.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

For ease understanding, dashed lines and/or bracketed text have been used in the figures to assist in the clarity of this description, and may signify the optional nature of some items (e.g., features not used by a given implementation of the invention; features supported by a given implementation, but used in some situations and not in others). Of course, other elements that are not dashed or bracketed herein may be optional in some embodiments, which will be obvious to those of skill in the art.

As used herein, the use of "a", "an" or "the" is intended to mean "at least one", unless specifically indicated to the contrary.

What is claimed is:

1. A method, comprising:
receiving, at a computing device, a first transaction information for a first transaction, wherein the first transaction information includes a first verification method and a first token value associated with a first account serving as a payment account for the first transaction, wherein the first token value is a substitute for a first primary account number of the first account and includes a first token issuer identifier;
identifying, by the computing device based upon the first token issuer identifier, a first entry of a plurality of entries of a token translation table comprising a plurality of token issuer identifiers, each token issuer identifier associated with multiple payment processing networks, and each payment processing network associated with one or more verification methods, wherein the first entry is associated with the first token issuer identifier and identifies a plurality of payment processing networks that are eligible to process transactions associated with the first token issuer identifier;

selecting, by the computing device, a first payment processing network of the plurality of payment processing networks to process the first transaction based at least in part upon the first token issuer identifier and the first verification method;

transmitting, by the computing device, the first transaction information to the selected first payment processing network, wherein the first payment processing network de-tokenizes the first token value to obtain the first primary account number, and transmits a first payment authorization request message including the first primary account number to a first issuer for authorization;

updating, by the computing device, the token issuer identifiers in the token translation table with updated token issuer identifiers without altering the multiple payment processing networks and their associated verification methods in the token translation table to form an updated token translation table;

receiving, at the computing device, a second transaction information for a second transaction, wherein the second transaction information includes a second verification method different than the first verification method and a first updated token value associated with the first account, wherein the first updated token value includes a first updated token issuer identifier;

identifying, by the computing device based upon the second verification method and the first updated token issuer identifier, a first entry of the updated token translation table;

selecting, by the computing device, a second payment processing network of the plurality of payment processing networks identified by the first entry of the updated token translation table, wherein the second payment processing network is different than the first payment processing network selected for the first transaction; and transmitting, by the computing device, the second transaction information to the second payment processing network, wherein the second payment processing network de-tokenizes the first updated token value to obtain the first primary account number, and transmits a second payment authorization request message including the first primary account number to the first issuer for authorization.

2. The method of claim 1, wherein:
at least one of the plurality of payment processing networks that are eligible to process transactions associated with the first token issuer identifier is a credit network; and
at least one of the plurality of payment processing networks that are eligible to process transactions associated with the first token issuer identifier is a debit network.

3. The method of claim 1, wherein:
at least one of the one or more verification methods indicates that the corresponding payment processing network is a personal identification number (PIN) verification network; and at least one of the one or more verification methods indicates that the corresponding payment processing network is a signature verification network.

4. The method of claim 1, wherein:
the first token issuer identifier comprises a token bank identification number (BIN); and
the plurality of entries of the token translation table include a plurality of token BINs.

5. The method of claim 1, further comprising:
receiving, at the computing device, a third transaction information for a third transaction, wherein the third transaction information includes a second token value associated with a second account, wherein the second token value includes a second token issuer identifier;
identifying, by the computing device based upon the second token issuer identifier, a second entry of the token translation table, wherein the second entry identifies only one payment processing network that is eligible to process transactions associated with the second token issuer identifier, and wherein the second entry further identifies one verification method corresponding to the identified one payment processing network;
selecting, by the computing device, the identified one payment processing network identified by the second entry, which is a third payment processing network, wherein the third payment processing network is different than the first payment processing network selected for the first transaction; and
transmitting the second transaction information to the third payment processing network, wherein the third payment processing network de-tokenizes the second token value to obtain a second primary account number, and transmits a third payment authorization request message including the second primary account number to a second issuer for authorization.

6. The method of claim 1, wherein the updated token issuer identifiers are received from an issuer of primary account numbers associated with tokens using the updated token issuer identifiers.

7. The method of claim 1, wherein the first payment processing network receives an authorization response message from the first issuer.

8. The method of claim 1, further comprising:
identifying, based on the first transaction information, an account enhancement attribute corresponding to the first account,
wherein the first payment processing network of the plurality of payment processing networks to process the first transaction is further selected based upon the account enhancement attribute.

9. A non-transitory computer-readable storage medium storing instructions which, when executed by one or more processors of a computing device, cause the computing device to perform operations comprising:
receiving a first transaction information for a first transaction, wherein the first transaction information includes a first verification method and a first token value associated with a first account serving as a payment account for the first transaction, wherein the first token value is a substitute for a first primary account number of the first account and includes a first token issuer identifier;
identifying, based upon the first token issuer identifier, a first entry of a plurality of entries of a token translation table comprising a plurality of token issuer identifiers, each token issuer identifier associated with multiple payment processing networks, and each payment processing network associated with one or more verification methods, wherein the first entry is associated with the first token issuer identifier and identifies a plurality of payment processing networks that are eligible to process transactions associated with the first token issuer identifier;

selecting a first payment processing network of the plurality of payment processing networks to process the first transaction based at least in part upon the first token issuer identifier and the first verification method;

transmitting the first transaction information to the selected first payment processing network, wherein the first payment processing network de-tokenizes the first token value to obtain the first primary account number, and transmits a first payment authorization request message including the first primary account number to a first issuer for authorization;

updating the token issuer identifiers in the token translation table with updated token issuer identifiers without altering the multiple payment processing networks and their associated verification methods in the token translation table to form an updated token translation table;

receiving a second transaction information for a second transaction, wherein the second transaction information includes a second verification method different than the first verification method and a first updated token value associated with the first account, wherein the first updated token value includes a first updated token issuer identifier;

identifying, based upon the second verification method and the first updated token issuer identifier, a first entry of the updated token translation table;

selecting a second payment processing network of the plurality of payment processing networks identified by the first entry of the updated token translation table, wherein the second payment processing network is different than the first payment processing network selected for the first transaction; and transmitting the second transaction information to the second payment processing network, wherein the second payment processing network de-tokenizes the first updated token value to obtain the first primary account number, and transmits a second payment authorization request message including the first primary account number to the first issuer for authorization.

10. The non-transitory computer readable storage medium of claim 9, wherein:
at least one of the plurality of payment processing networks that are eligible to process transactions associated with the first token issuer identifier is a credit network; and
at least one of the plurality of payment processing networks that are eligible to process transactions associated with the first token issuer identifier is a debit network.

11. The non-transitory computer readable storage medium of claim 9, wherein:
at least one of the one or more verification methods indicates that the corresponding payment processing network is a personal identification number (PIN) verification network; and
at least one of the one or more verification methods indicates that the corresponding payment processing network is a signature verification network.

12. The non-transitory computer readable storage medium of claim 9, wherein the first transaction information is received within an authorization request message.

13. The non-transitory computer readable storage medium of claim 9, wherein the identified first entry further identifies a type of account associated with the first token issuer identifier.

14. The non-transitory computer readable storage medium of claim 9, further comprising:
identifying, based on the first transaction information, an account enhancement attribute corresponding to the first account,
wherein the first payment processing network of the plurality of payment processing networks to process the first transaction is further selected based upon the account enhancement attribute.

15. A computing device, comprising:
one or more processors;
one or more network interfaces communicatively coupled with the one or more processors; and
a non-transitory computer readable storage medium, coupled to the one or more processors, that stores instructions which, when executed by the one or more processors, cause the computing device to perform operations comprising:
receiving, at the one or more network interfaces, a first transaction information for a first transaction, wherein the first transaction information includes a first verification method and a first token value associated with a first account serving as a payment account for the first transaction, wherein the first token value is a substitute for a first primary account number of the first account and includes a first token issuer identifier;
identifying, based upon the first token issuer identifier, a first entry of a plurality of entries of a token translation table comprising a plurality of token issuer identifiers, each token issuer identifier associated with multiple payment processing networks, and each payment processing network associated with one or more verification methods, wherein the first entry is associated with the first token issuer identifier and identifies a plurality of payment processing networks that are eligible to process transactions associated with the first token issuer identifier;
selecting a first payment processing network of the plurality of payment processing networks to process the first transaction based at least in part upon the first token issuer identifier and the first verification method;
transmitting, by the one or more network interfaces, the first transaction information to the selected first payment processing network, wherein the first payment processing network de-tokenizes the first token value to obtain the first primary account number, and transmits a first payment authorization request message including the first primary account number to a first issuer for authorization;
updating, by the computing device, the token issuer identifiers in the token translation table with updated token issuer identifiers without altering the multiple payment processing networks and their associated verification methods in the token translation table to form an updated token translation table;
receiving, at the one or more network interfaces, a second transaction information for a second transaction, wherein the second transaction information includes a second verification method different than the first verification method and a first updated token value associated with the first account, wherein the first updated token value includes a first updated token issuer identifier;

identifying, based upon the second verification method and the first updated token issuer identifier, a first entry of the updated token translation table;

selecting a second payment processing network of the plurality of payment processing networks identified by the first entry of the updated token translation table, wherein the second payment processing network is different than the first payment processing network selected for the first transaction; and transmitting, by the one or more network interfaces, the second transaction information to the second payment processing network, wherein the second payment processing network de-tokenizes the first updated token value to obtain the first primary account number, and transmits a second payment authorization request message including the first primary account number to the first issuer for authorization.

16. The computing device of claim 15, wherein:

at least one of the plurality of payment processing networks that are eligible to process transactions associated with the first token issuer identifier is a credit network; and at least one of the plurality of payment processing networks that are eligible to process transactions associated with the first token issuer identifier is a debit network.

17. The computing device of claim 15, wherein:

at least one of the one or more verification methods indicates that the corresponding payment processing network is a personal identification number (PIN) verification network; and at least one of the one or more verification methods indicates that the corresponding payment processing network is a signature verification network.

18. The computing device of claim 15, wherein:

The first token issuer identifier comprises a token bank identification number (BIN); and the plurality of entries of the token translation table include a plurality of token BINs.

19. The computing device of claim 15, wherein the identified first entry further identifies a type of account associated with the first token issuer identifier.

20. The computing device of claim 15, further comprising:

identifying, based on the first transaction information, an account enhancement attribute corresponding to the first account, wherein the first payment processing network of the plurality of payment processing networks to process the first transaction is further selected based upon the account enhancement attribute.

* * * * *